United States Patent
Filippov et al.

(10) Patent No.: US 11,265,535 B2
(45) Date of Patent: Mar. 1, 2022

(54) METHOD AND APPARATUS FOR HARMONIZING MULTIPLE SIGN BIT HIDING AND RESIDUAL SIGN PREDICTION

(71) Applicant: Huawei Technologies Co., Ltd., Shenzhen (CN)

(72) Inventors: Alexey Konstantinovich Filippov, Moscow (RU); Alexander Alexandrovich Karabutov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/013,094

(22) Filed: Sep. 4, 2020

(65) Prior Publication Data
US 2020/0404257 A1    Dec. 24, 2020

Related U.S. Application Data

(63) Continuation of application No. PCT/RU2018/000141, filed on Mar. 7, 2018.

(51) Int. Cl.
*H04N 19/105* (2014.01)
*H04N 19/129* (2014.01)
(Continued)

(52) U.S. Cl.
CPC ......... *H04N 19/105* (2014.11); *H04N 19/129* (2014.11); *H04N 19/176* (2014.11);
(Continued)

(58) Field of Classification Search
None
See application file for complete search history.

(56) References Cited

U.S. PATENT DOCUMENTS

| 9,088,769 | B2 * | 7/2015 | He | H04N 19/91 |
| 2012/0018815 | A1 * | 1/2012 | Toh | H01L 21/324 |
| | | | | 257/408 |

(Continued)

FOREIGN PATENT DOCUMENTS

JP    2014534764 A    12/2014

OTHER PUBLICATIONS

Kazui et al., "Description of video coding technology proposal by Fujitsu," Joint Collaborative Team on Video Coding (JCT-VC) of ITU-T SG16 WP3 and ISO/IEC JTC1/SC29/WG11, 1st Meeting: Dresden, DE, No. JCTVC-A115, XP030007555, pp. 1-23 (Apr. 15-23, 2010).

(Continued)

*Primary Examiner* — Patricia I Young
(74) *Attorney, Agent, or Firm* — Leydig, Voit & Mayer, Ltd.

(57) ABSTRACT

The present invention relates to an improved apparatus and method for harmonizing both Sign Bit Hiding (SBH) and Residual Sign Prediction (RSP) techniques in video coding. In order to improve coding efficiency, a list of transform coefficients, to which RSP is to be applied is prepared in advance of selecting a coefficient to which SBH is applied. Thereby, the RSP list can be populated in such a manner that the highest coding efficiency may be expected. Subsequently, one or more coefficients for applying SBH are selected so as not to be included in the list.

40 Claims, 16 Drawing Sheets

(51) Int. Cl.
  *H04N 19/176* (2014.01)
  *H04N 19/18* (2014.01)
  *H04N 19/64* (2014.01)
  *H04N 19/91* (2014.01)
(52) U.S. Cl.
  CPC ............. *H04N 19/18* (2014.11); *H04N 19/64* (2014.11); *H04N 19/91* (2014.11)

(56) References Cited

U.S. PATENT DOCUMENTS

| | | | |
|---|---|---|---|
| 2013/0188725 A1 | 7/2013 | Wang et al. | |
| 2013/0336409 A1* | 12/2013 | He | H04N 19/467 375/240.25 |
| 2014/0003533 A1* | 1/2014 | He | H04N 19/00 375/240.25 |
| 2016/0173901 A1* | 6/2016 | He | H04N 19/467 375/240.25 |
| 2017/0142444 A1 | 5/2017 | Henry | |
| 2017/0324643 A1* | 11/2017 | Seregin | H04N 19/16 |
| 2018/0176582 A1* | 6/2018 | Zhao | H04N 19/184 |

OTHER PUBLICATIONS

Henry et al., "Residual Coefficient Sign Prediction," Joint Video Exploration Team (JVET) of ITU-T SG 16 WP 3 and ISO/IEC JTC 1/SC 29/WG 11, 4th Meeting: Chengdu, CN, No. JVET-D0031, XP030150258, pp. 1-6 (Oct. 15-21, 2016).

Clare et al., "Sign Data Hiding," Joint Collaborative Team on Video Coding (JCT-VC) of ITU-T SG16 WP3 and ISO/IEC JTC1/SC29/WG11, 7th Meeting: Geneva, CH, JCTVC-G271, XP030110255, pp. 1-9 (Nov. 21-30, 2011).

Yu et al., "Multiple Sign Bits Hiding," Joint Collaborative Team on Video Coding (JCT-VC) of ITU-T SG16 WP3 and ISO/IEC JTC1/SC29/WG11, 8th Meeting: San Jose, CA, USA, JCTVC-H0481, XP030111508, pp. 1-8 (Feb. 1-10, 2012).

Huang et al., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, JVET-C0024, total 5 pages (May 26-Jun. 1, 2016).

"Series H: Audiovisual and Multimedia Systems Coding of moving video, Implementors Guide for H.263: Video coding for low bit rate communication," ITU-T H.263, total 10 pages, International Union of Telecommunication, Geneva, Switzerland (Aug. 5, 2005).

"Series H: Audiovisual and Multimedia Systems Infrastructure of audiovisual services—Coding of moving video, Information technology—Generic coding of moving pictures and associated audio information: Video: Frame packing arrangement signalling for 3D content, Amendment 4," ITU-T H.262, total 238 pages, International Union of Telecommunication, Geneva, Switzerland (Feb. 2012).

"Line Transmission of Non-Telephone Signals, Video Codec for Audiovisual Services At p × 64 kbits," ITU-T H.261, total 29 pages, International Telecommunication Union (Mar. 1993).

"Series H: Audiovisual and Multimedia Systems Infrastructure of audiovisual services—Coding of moving video, High efficiency video coding," ITU-T H.265, Telecommunication Standardization Sector of ITU, total 692 pages (Feb. 2018).

"Series H: Audiovisual and Multimedia Systems, Infrastructure of audiovisual services—Coding of moving video, Advanced video coding for generic audiovisual services," ITU-T H.264, Telecommunication Standardization Sector of ITU, total 812 pages (Apr. 2017).

"Information technology—High efficiency coding and media delivery in heterogeneous environments—Part 2: High afficiency video coding," International Standard, ISO/IEC 23008-2, total 13 pages (Dec. 2013).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

\* cited by examiner

METHOD AND APPARATUS FOR HARMONIZING MULTIPLE SIGN BIT HIDING AND RESIDUAL SIGN PREDICTION

CROSS-REFERENCE TO RELATED APPLICATIONS

This application is a continuation of International Application No. PCT/RU2018/000141, filed on Mar. 7, 2018, the disclosure of which is hereby incorporated by reference in its entirety.

FIELD

Embodiments of the present disclosure relate to the field of picture processing, for example still picture and/or video picture coding.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

As will be described in more detail below, some image and video codecs code quantized transformation coefficients. Non-zero transformation coefficients are signed, i.e. consist of an absolute value and either plus or minus sign. Coding of a sign for one coefficient requires one bit indicating either a positive or a negative sign. In other words, a sign bit value "0" may indicate positive sign, while a sign bit value "1" may indicate negative sign, or vice versa.

In G. Clare, F. Henry, and J. Jung, "Sign Data Hiding," Contribution JCTVC-G0271 to the 7$^{th}$ JCT-VC meeting, Geneva, Switzerland, November 2011, a technique known as Sign Data Hiding (SDH) was proposed for adopting it to the H.265/HEVC Working Draft. The basic idea behind this contribution was as follows. For each TU (Transform Unit) satisfying the condition that the number of coefficients between the first $P_{FSC}$ and last $P_{LSC}$ nonzero coefficients is greater than a threshold $D_{thr}$:

$$P_{LSC} - P_{FSC} \geq D_{thr},$$

the sign bit for the first nonzero coefficient is embedded into the parity of the sum of all nonzero coefficients. Four thresholds are signaled according to four data types (see Table 1). For all TUs with various sizes from 4×4 to 32×32, one sign bit is hidden for each TU [2].

TABLE 1

Thresholds are for four data types

| CU type | Intra | Inter |
|---|---|---|
| Luma | 5 | 3 |
| Chroma | 5 | 5 |

Finally, a modification of the SDH technique known as Multiple Sign Bits Hiding (Multiple SBH, MSBH) was adopted for the H.265/HEVC standard. In MSBH, TUs with a larger size than 4×4 may have multiple sign bits embedded. Specifically, as coefficients in a large TU are coded by 4×4 coefficient groups, also known as a Coefficients Group (CG), MSBH applies the sign bit hiding technique to each 4×4 coefficient group as shown in FIG. 1. If the sign is "+", the parity of absolute values of quantized transform coefficients should be kept even. Otherwise, the parity should be kept odd. As such, a single threshold for the number of coefficients is initially defined for each picture (its default value is $D_{thr}$=4). See X. Yu, J. Wang, D. He, G. Martin-Cocher, and S. Campbell, "Multiple Sign Bits Hiding," Contribution JCTVC-H0481 to the 8th JCT-VC meeting, San Jose, USA, February 2012. In the final version of the H.265/HEVC standard, this threshold is unchangeable.

FIG. 1 shows a larger TU 410 with a size of 16×16 coefficients, which is divided into 16 coefficient groups with the size 4×4, of which the first CG is denoted by reference numeral 420. FIG. 1 further shows, for each CG, the first non-zero quantized transform coefficient and the last non-zero quantized transform coefficient in a predetermined scanning order. The diagonal arrows indicate the scanning order of the coefficients in FIG. 1 In this example, the scanning order is diagonal from top to bottom. However, it is noted that sign bit hiding may also work with different scan orders. In such case, the position of the first and the last non-zero coefficients may change corresponding to the scan order. It is noted that the scanning order may be predetermined in various ways. For example, it may be predefined in a standard or configurable by signaling one of possible predefined scans specified in a standard within the bitstream or configurable by defining the scan within the bitstream.

In accordance with a conventional approach, in the following it is assumed that the sign of the first non-zero coefficient (in scan order) is embedded (coded) in the parity of the sum of all non-zero coefficients (unsigned). However, in general, a sign of another non-zero coefficient may be conveyed in this way. For a particular CG, if the sign of the first non-zero coefficient is positive, the parity of absolute values of quantized transform coefficients is to be even. Otherwise (if sign of the first non-zero coefficient is negative), the parity is to be odd. Accordingly, the sign bit data hiding at the encoder includes the following steps for one CG:

a) Check, whether conditions for applying sign bit hiding are fulfilled for the CG.
b) Determine the first non-zero coefficient in the CG and its sign.
c) Calculate parity of the sum of all absolute coefficient values in the CG.
d) Embed the determined sign: If the calculated parity corresponds to the determined sign, no modification of coefficient values is necessary. Otherwise, a value of one of the coefficients the CG is modified by increasing or decreasing it by one, so that the parity corresponds to the determined sign.

The above steps are repeated for all CGs in the TU.

Correspondingly, at the decoder, the following steps are performed for one CG:

a) Parse from the bitstream unsigned coefficient values of the CG.
b) Determine whether or not sign data hiding was applied based on conditions and/or information extracted from a bitstream (such as a flag indicating whether or not SBH is allowed).
c) Determine the first non-zero coefficient in the CG.
d) Calculate parity of the sum of all absolute coefficient values in the CG.
e) If the parity has a first value (even or odd), set the sign of the first non-zero coefficient to the respective first polarity corresponding to the first value (positive or negative).

The above steps are only exemplary. Parity may be calculated as modulo 2 applied to the sum, which corresponds to taking the least significant bit of the binary representation of the sum. It is noted that, in general, a function different from parity of the sum of all coefficients may be applied to embed in its result one or more signs of the respective one or more coefficients in the CG. For instance, in order to hide 2 signs, a modulo 4 operation applied to the sum of absolute value of all coefficients may be applied. Each possible result of the modulo 4 operation (there are four possible results 0, 1, 2, 3) may be assign one combination of the first and second sign (e.g. ++, +−, −+, −−).

Step d) of the encoder side mentioned above defines the embedding of the one or more signs into the function of coefficients of the CG. In general, if modification of a coefficient is necessary to match the parity to the sign to be embedded, the image signal reconstructed from such modified CG may experience some distortion. Accordingly, it is beneficial if the coefficient to be modified in value is selected based on minimizing distortion or optimizing a rate-distortion function. The same applies if more than one signs are coded. In such a case, one or more coefficient values may be modified to embed the signs.

The present disclosure is applicable to multiple sign bit hiding based on the CGs, but may equally be applied to a TU directly without splitting the TU further into the CGs.

As described above, the CGs are obtained by spatially separating transform coefficients in transform domain into groups of the same size (e.g., 4×4 coefficients as shown in FIG. 1). In other words, the dividing of a TU into CGs precedes serializing the transform coefficients by scanning them using a space filling curve (predetermined scan order).

An alternative way to separate a TU into groups is firstly to scan coefficients and then to divide the serialized coefficients into groups that we will call here Coefficients Chunks (CCs) to distinguish between these two definitions. This separation mechanism is presented in FIG. 2.

In particular, FIG. 2 shows an 8×8 block (TU) of coefficients. They are serialized by scanning them in the predetermined order, e.g. such as in this case a zig-zag scanning order. After the scanning, the coefficients are provided in a sequence shown on the bottom of FIG. 2. The sequence is then divided into chunks of coefficients CC #0, CC #1, . . . , Last CC.

The chunks may be processed in a similar way as shown for the CGs above. For each chunk, one or more conditions are evaluated to determine whether or not SBH is to be applied for the CC. If SBH is to be applied, embedding the sign of the first non-zero coefficient into a function of a plurality or all coefficients in the CC.

In contrast to the HM (HEVC Reference Model) framework that is a reference implementation of the H.265/HEVC standard and where QT (Quad-Tree)-based partitioning was used in a combination with asymmetric partitioning for inter-predicted blocks, a new partitioning mechanism based on both quad-tree and binary tree and known as QTBT (Quad-Tree Binary Tree) was proposed for the JEM-3.0 software. QTBT partitioning can provide not just square but rectangular blocks as well. Of course, some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and, hence, demonstrates significantly higher coding efficiency than the conventional quad-tree partitioning. See Han Huang, Kai Zhang, Yu-Wen Huang, and Shawmin Lei, "EE2.1: Quadtree plus binary tree structure integration with JEM tools," Contribution JVET-O0024 to the 3rd JVET meeting, Geneva, Switzerland, May 2016. Anyway, these changes of partitioning mechanisms can impact residual coding in general and SBH in particular.

Another relevant technique, known as "Residual Sign Prediction" (RSP) and originally proposed in K. Kazui et al. "Video coding technology proposal by Fujitsu", Contribution JCTVC-A115 to the $1^{st}$ JCT-VC meeting, Dresden, Germany, April 2010, ("Kazui") estimates the signs of a block from pixels in neighboring blocks and encodes the difference (0: same, 1: not same) between estimated signs and true signs by CABAC (Context-Adaptive Binary Arithmetic Coding). If the signs are well estimated, the difference tends to be '0', and the coding efficiency can be improved by CABAC. The concept is illustrated in FIG. 3.

Generally there is high correlation among pixels at the boundary of current block and that of neighboring blocks. The proposed technique predicts the signs of DCT (Discrete Cosine Transform) coefficients of current block using this property.

When there are N non-zero coefficients in a current block, the number of possible combinations of these signs is $2^N$. The proposed technique compares reconstructed pixels at the upper boundary and left boundary of current block using each combination of signs with pixels extrapolated from neighboring blocks. The combination of signs that minimizes the square error is defined as estimated signs. More specifically, the technique may be applied not to all non-zero (i.e. significant) coefficients in of a set of transform coefficients (such as a coefficient group) but only to a sub-set of the transform coefficients, which will, throughout this disclosure, also called a "list". For instance as shown in the following FIG. 4, the list may be formed of the first M (out of the overall number of N) coefficients in magnitude, when sorted in descending order. Such a rule for preparing the list reflects the fact that the applied estimation method tends to give better results the higher the coefficients which signs are estimated are in magnitude (absolute value).

As a skilled person will understand, the thus estimated signs are not necessarily correct, i.e. there may be a difference between the actual (original) signs and the estimated signs, as shown in FIG. 4, wherein one (the fourth) out of M=6 signs in the list is estimated incorrectly (−1 instead of 1). The reason is that the pixel values obtained by the extrapolation are generally defective and thus another combination of signs than the correct one can lead to the minimum square error.

FIG. 4 shows a comparison of the method proposed in Kazui with the conventional H.264/AVC sign coding.

The steps of the technique from Kazui are shown in FIG. 4 and given in Table 2.

TABLE 2

| | Steps of technique proposed in Kazui | |
|---|---|---|
| 1 | Sorting of coefficients | Coefficients are sorted by their absolute value of level. |
| 2 | Sign estimation | Signs of coefficients are estimated as illustrated in FIG. 3 Specifically, there is a limitation of the maximum number of signs to be estimated. Up to first M signs in the sorted coefficients are estimated, where M is equal to 4 for 4x4 block and 6 for 8x8 block. The reason of this limitation is that the estimation result of a sign of coefficient with small level tends to be wrong. A fast sign estimation method is introduced in order to reduce the computational complexity. |
| 3 | Entropy coding | Exclusive OR operation is performed to the first M signs of the sorted coefficients and their estimated values. The result, coeff_sign_diff is encoded using CABAC process. Other signs are encoded using the bypass process of CABAC (i.e. encoding process of coeff_sign_flag). |

A similar technique is described in F. Henry, G. Clare, "Residual sign prediction", Contribution JVET-D0031 to the 4th JVET meeting, Chengdu, China, October 2016 ("Henry"). It is noted, that Henry contains a "Hypothesis Border Reconstructions" section that proposes to eliminate redundant calculations of hypothesis costs by reusing results of previous calculations. However, a method of fast sign estimation is already disclosed in Kazui.

One of the differences between techniques disclosed in Henry and Kazui is in that sign estimation is performed in Kazui using L2 norm (sum of squared differences, SSD), while Henry uses L1 norm (sum of absolute differences).

Pixels used to derive a cost value are selected from neighboring blocks (see FIG. 5).

In spatial domain the cost function is defined (see Henry) as:

$$F = \Sigma_{n=0}^{N-1} |2X_{n,-1} - X_{n,-2} - Y_{n,0}| + \Sigma_{m=0}^{M-1} |2Z_{-1,m} - Z_{-2,m} - Y_{0,m}|, \quad (1)$$

where N and M here are height and width of the block.

US patent application publication US2017/0142444 A1 contains additional details relating to sign estimation.

Additionally, US 2017/0142444 A1 proposes a different method to encode predicted signs (step 3 of Table 2). In reference software proposed together with Henry, this modification was implemented by introduction of two lists of predicted signs (modification of step 1 of Table 2). Predicted signs belonging to these two lists are encoded with different CABAC contexts. The following rules are specified to populate these lists:

The first list is populated with signs of coefficients having magnitude greater than a predefined threshold $T_1$. Total number of signs in the first list is constrained by pre-defined value M If the number of signs in the first list n is lesser than M, the second list is being populated. Total number of signs in the second list is constrained by (M−n), so that the total number of signs in both lists does not exceed M Coefficients populating the second list are sorted by their position in raster order, the magnitudes should not be greater than $T_1$.

The context to encode the sign is determined on whether it belongs to the first or to the second list (difference in step 3 of Table 2).

Both RSP and SBH are two techniques aimed at reducing the rate caused by transform coefficients signs that are conventionally entropy-coded in the EP (equally probable) mode, i.e. probability of each binary state (plus/minus) are considered to be close to 50%. Consequently, each bin requires 1 bit in an output bit stream. Although RSP and SBH exploit different mechanisms for squeezing sign bits, it is necessary to harmonize these two techniques by defining a strict order of applying RSP and SBH to residue signs. A mechanism of harmonizing SBH and RSP proposed in Henry is shown in FIG. 6. In that technique, RSP uses 2 lists denoted in FIG. 6 as RSP-lists:

HP-list is a list that includes positions of such quantized transform coefficients that have magnitudes higher than the threshold and, therefore, their signs can be correctly predicted with higher probability;

LP-list is a list that includes positions of such quantized transform coefficients that have magnitudes lower than the threshold and, therefore, their signs can be correctly predicted with lower probability.

As can be seen from FIG. 6, SBH is performed before RSP. This can adversely affect the coding efficiency of RSP if SBH hides signs of such quantized transform coefficients that have magnitudes which are higher than the threshold and, therefore, their signs can be correctly predicted with high probability. So, the main problem of the known mechanisms of harmonizing SBH (SDH or MSBH) and RSP techniques is that they can reduce the probability of correct sign prediction by selecting for SBH or modifying quantized transform coefficients from an HP-list. Thus, it decreases the coding efficiency of RSP techniques.

SUMMARY

The present disclosure provides an improved concept for harmonizing SBH and RSP avoiding the above described adverse effects on coding efficiency and thereby improving the compression performance.

According to a first aspect of the present disclosure, an apparatus for encoding signs of a set of transform coefficients of a signal is provided. The apparatus comprises processing circuitry that is configured to determine a list of transform coefficients, including a first plurality of transform coefficients out of the set of transform coefficients, according to a first predetermined rule and to select a further transform coefficient, out of the set of transform coefficients and not being included in the list, according to a second predetermined rule. The processing circuitry is further configured to embed the sign of the further transform coefficient in a result of a predetermined function of transform coefficient values in the set of transform coefficients and to perform an estimation procedure for estimating the signs of the transform coefficients in the list. Further, the processing circuitry is configured to determine, for each of the first plurality of transform coefficients, a binary value indicating whether or not the sign of the transform coefficient coincides with the estimated sign of the transform coefficient and to encode the sequence of binary values obtained for the first plurality of transform coefficients using an entropy coding technique.

According to a second aspect of the present disclosure, an apparatus for decoding signs of a set of transform coefficients of a signal is provided. The apparatus comprises processing circuitry that is configured to decode an entropy encoded sequence of the first plurality of binary values. The processing circuitry is further configured to determine a list of transform coefficients, including a first plurality of transform coefficients out of the set of transform coefficients, according to a first predetermined rule and to select a further transform coefficients, out of the set of transform coefficients and not being included in the list, according to a second predetermined rule. Further, the processing circuitry is configured to determine the sign of the further transform coefficient by calculating a predetermined function of transform coefficient values in the set of transform coefficients, perform an estimation procedure for estimating the signs of the transform coefficients in the list and correct the estimated signs by means of the decoded sequence of a first plurality of binary values, so as to obtain the signs of the first plurality of transform coefficients.

In accordance with a third aspect of the present disclosure, a method of encoding signs of a set of transform coefficients of a signal is provided. The method comprises the steps of determining a list of transform coefficients, including a first plurality of transform coefficients out of the set of transform coefficients, according to a first predetermined rule, selecting a further transform coefficient, out of the set of transform coefficients and not being included in the list, according to a second predetermined rule, embedding the sign of the further transform coefficient in a result of a predetermined function of transform coefficient values in the set of transform coefficients, performing an estimation procedure for estimating the signs of the transform coefficients in the list, determining, for each of the first plurality of transform coefficients, a binary value indicating whether or not the sign of the transform coefficient coincides with the estimated sign of the transform coefficient and encoding the sequence of binary values obtained for the first plurality of transform coefficients using an entropy coding technique.

In accordance with a fourth aspect of the present disclosure, a method of decoding signs of a set of transform coefficients of a signal is provided. The method comprises the steps of decoding an entropy encoded sequence of a first plurality of binary values, determining a list of transform coefficients, including a first plurality of transform coefficients out of the set of transform coefficients, according to a first predetermined rule, selecting a further transform coefficient, out of the set of transform coefficients in the set of transform coefficients, performing an estimation procedure for estimating the signs of the transform coefficients in the list and correcting the estimated signs by means of the decoded sequence of a first plurality of binary values, so as to obtain the signs of the first plurality of transform coefficients.

According to the present disclosure, a signal means, in particular, for instance, a video signal or image signal. The signal may also include an audio signal. The processing circuitry can be implemented by any combination of software and/or hardware. The set of transform coefficients is, in particular, a coefficient group or a coefficient chunk.

It is a particular approach of embodiments of the present disclosure to separate the RSP procedure into two sub-procedures, namely the preparation of one or more RSP lists in a first sub-procedure, and performing other actions related to the RSP technique in the second sub-procedure. SBH is performed between these sub-procedures. Thereby, a coefficient for applying SBH can be deliberately selected so as not to be included in the RSP list or lists, rather than taking, for instance, the first significant quantized transform coefficient of a coefficient group (CG) or a coefficient chunk (CC) by default.

In accordance with embodiments, the estimation procedure is performed in the pixel domain (spatial domain). The estimation procedure includes reconstructing boundary pixels of a block of an image corresponding to the set of transform coefficients in the spatial domain, for each hypothetical combination of signs of the first plurality of transform coefficients, evaluating a predetermined spatial domain function indicating the smoothness of pixel values across the block boundaries between the reconstructed pixels and pixels of adjacent blocks for each of the hypothetical combinations, and selecting a hypothetical combination for which the predetermined spatial domain function indicates a maximum of smoothness, as the estimated signs of the transform coefficients. The predetermined spatial domain function (cost function) is, in particular, a function using the sum of absolute differences between pixel values of pixels that are adjacent along boundaries of a current block and neighboring blocks, such as the function defined in equation (1) above. Alternatively, other functions indicating the smoothness of pixel values are equally possible, such as a function using the sum of squared differences, instead of the sum of absolute differences.

In accordance with alternative embodiments, the estimation procedure is performed in the transform domain (frequency domain). The estimation procedure includes estimating the signs based on a cost function including transformed difference between adjacent pixels neighboring a current image block corresponding to the set of transform coefficients and the prediction of the adjacent pixels calculated based on a prediction signal of the image block.

Specifically, the cost function may include a sum of squared transformed differences between the adjacent pixels neighboring the transformed image block and the prediction of the adjacent pixels calculated based on a prediction signal of the image block. An example of such a cost function is given below (equation (2)).

In accordance with embodiments, the second predetermined rule defines to select, as the further transform coefficient, the most low-frequency non-zero transform coefficient not belonging to the list.

In accordance with embodiments, the processing circuitry is further configured to encode the signs of a second plurality of transform coefficients of the set by a predetermined entropy encoding procedure, the second plurality of transform coefficients including all remaining non-zero transform coefficients not belonging to the first plurality included in the list and being different from the selected further transform coefficient.

In accordance with embodiments, the list includes at least two sub-lists. The sub-lists are divided from each other by means of the threshold such that a first sub-list includes the transform coefficients having absolute values greater than the threshold and the second sub-list includes the transform coefficients having absolute values equal to or below the threshold.

Further, the sequences of binary values indicating the coincidence with the estimated signs determined for the transform coefficients of the two sub-lists are encoded with different contents of entropy encoding, respectively. As mentioned in the background section, the higher magnitude transform coefficients (above the threshold) in the first sub-list (HP-list) have a higher probability of correct prediction of the sign by the estimation procedure than those coefficients with a magnitude below the threshold in the second sub-list (LP-list). This is taken into account by the different encoding contexts.

In accordance with embodiments, the result of the predetermined function may assume two different values so that the first sign value corresponds to the first result value and the second sign value corresponds to a second result value. The embedding the sign of the further transform coefficient then includes determining whether the predetermined function of the transform coefficients as the result value corresponding to the sign of the further transform coefficient. The processing circuitry of the encoding apparatus is therefore further configured to modify a value of one of the transform coefficients so that the predetermined function of the transform coefficients after modification has the result corresponding to the sign of the further transform coefficient, if the predetermined function does not have the result corresponding to the sign of the further transform coefficient, before modification.

Further, the one of the transform coefficients to be modified and the modification is performed so as to minimize a rate-distortion cost function. For instance, if the result of the predetermined function is the parity of the sum of absolute coefficient values after quantization of transform coefficients of the set, it is sufficient to achieve the desired result by modifying an arbitrary one of the coefficients included in the sum either by +1 or by −1. Accordingly, by considering a rate-distortion cost function, an optimal selection can be made.

Alternatively, or in addition, a modification estimation function can be taken into account, which is minimized when there is a minimum of distortion introduced by the coefficient modification, or, alternatively, when the quantized level of the coefficient is the highest.

Also, in accordance with embodiments, wherein the list includes sub-lists, the processing circuitry of the encoding apparatus is further configured to put a constraint on the modification of the value of transform coefficient so as not to permit modification that would lead to a change in the distribution of the first plurality of transform coefficients over the sub-lists. Namely, because in accordance with the present disclosure, the coefficients included in the lists (more specifically: their positions in a coefficient group or chunk) are selected in advance of performing the embedding of signs (SBH), the (positions of the) coefficients in the sub-lists should not be changed so as to be properly decoded on the decoder side.

More specifically, when there are two sub-lists divided from each other by means of the threshold value of the absolute values, the constraint may be defined so as not to permit modification of the value of a transform coefficient in case the modification would lead to a crossing of the threshold so that the modified value would belong to another sub-list than the unmodified value.

In accordance with embodiments, the transform coefficients are quantized transform coefficients.

In accordance with embodiments, the first predetermined rule defines, in accordance with embodiments, the list of transform coefficients as an ordered list of a predetermined number M of quantized transform coefficients. More specifically, the first predetermined rule further defines to include, in the list of transform coefficients, in descending order, the M transform coefficients having the highest absolute values in the set of transform coefficients.

In accordance with embodiments, the predetermined function is a sum of absolute transform coefficient values after quantization modulo 2, i.e. the parity of a sum of absolute transform coefficient values after quantization.

Alternatively, it is also possible to hide the signs of plural transform coefficients in the value of a predetermined function. More specifically, in an analogous manner as described above for a single coefficient, the signs of N coefficients can be hidden by means of a predetermined function that can assume $2^N$ different values, corresponding to the $2^N$ different possibilities of distributing the signs plus and minus over N coefficients.

Specifically, in accordance with embodiments, the processing circuitry is configured to select a plurality of N further transform coefficients, out of the set of transform coefficients and not included in the list, according to the second predetermined rule and to embed the signs of the further transform coefficients in a result of the predetermined function of transform coefficient values in the set of transform coefficients. More specifically, the predetermined function may be a sum of absolute transform coefficient values after quantization modulo $2^N$.

It is understood that in embodiments employing an embedding (hiding) of signs of plural transform coefficients, if modifications are necessary in order to obtain the desired function value corresponding to the correct combination of the signs, it may be not sufficient to change only a single coefficient by +1 or −1. Rather, it may be either necessary to change a single coefficient by an amount up to a maximum value of $+/-(2^N-1)$, or, alternatively, up to $2^N-1$ coefficients by +/−1 (or a combination of these possibilities). Hence, the constraints to be applied to the modification in case of plural RSP sub-lists are to be applied mutatis mutandis in the case of applying SBH to plural coefficients.

In accordance with embodiments, the processing circuitry is configured to split transform coefficients of the transform unit into a plurality of sets of transform coefficients and perform the processing according to the first aspect or second aspect of the disclosure for each of the plurality of sets of transform coefficients.

More specifically, in accordance with embodiments, the transform unit is a two-dimensional block of transform coefficients obtained by transforming an image signal and the processing circuitry is configured to split the transform unit into a plurality of two-dimensional blocks as the plurality of sets of transform coefficients. As a non-limiting example, the transform unit may be, for instance, a 16×16 or 8×8 block. The sets of transform coefficients may then be, for instance, 8×8 or 4×4 blocks.

In accordance with alternative embodiments, the transform unit is a two-dimensional block of transform coefficients obtained by transforming an image signal and the processing circuitry is configured to scan transform coefficients of the transform unit according to a predefined order and split the scanned transform coefficients into a plurality of one-dimensional chunks as said plurality of sets of transform coefficients.

In accordance with embodiments, the decoded binary values in accordance with the second aspect of the present disclosure indicate, for each transform coefficient in the list, whether or not the sign of the transform coefficient coincides with the estimated sign of the transform coefficients. In other words, the binary values indicate the difference between the estimated sign of the coefficient in accordance with the estimation procedure and the correct sign. Since the estimation is expected to be with little error only, in particular, for the high magnitude transform coefficients to be included in the list, it may be expected that the sequence of binary values comprises the value "0" (no difference, i.e. estimation was correct) much more often than the value "1" (sign incorrectly estimated). The sequence of binary values can therefore be more efficiently encoded by entropy coding (in particular CABAC coding) than the sign values themselves, which have an EP (equal probability) distribution, as indicated above.

In accordance with embodiments, the result of the calculation of the predetermined function may assume two different values and the sign of the further transform coefficient is determined according to the rule that it is the first sign value of the result is a first value and a second sign value of the result is a second value. For instance, the two different values may correspond to a parity of a calculation result (even or odd).

Details of one or more embodiments of the present disclosure are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1:
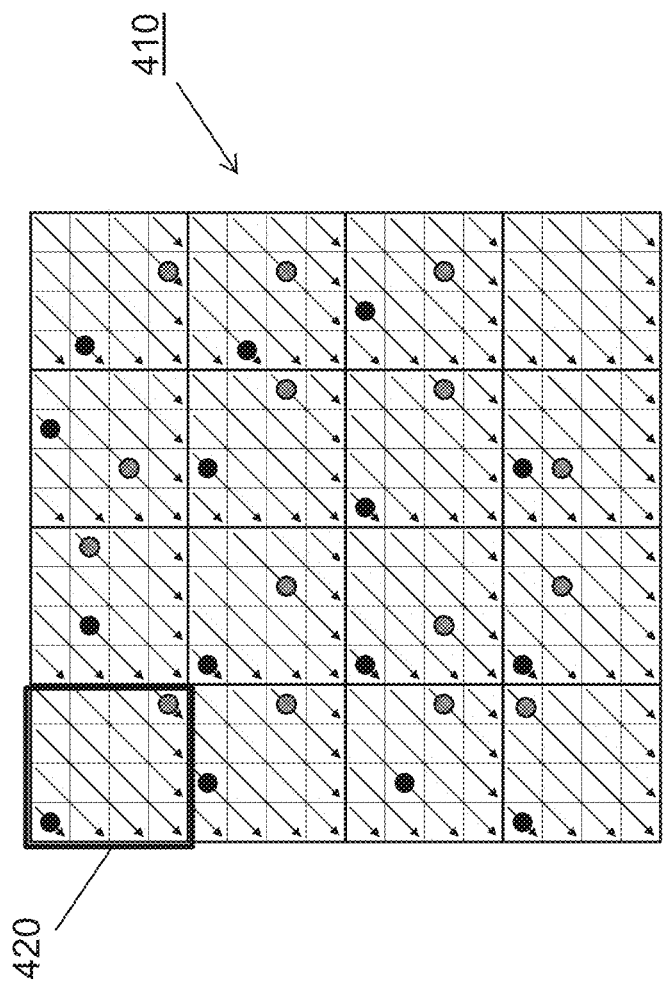
FIG. 1 is a diagram showing Multiple Sign Bit Hiding adopted by JCT-VC to the HEVC/H.265 standard.
Figure 2:
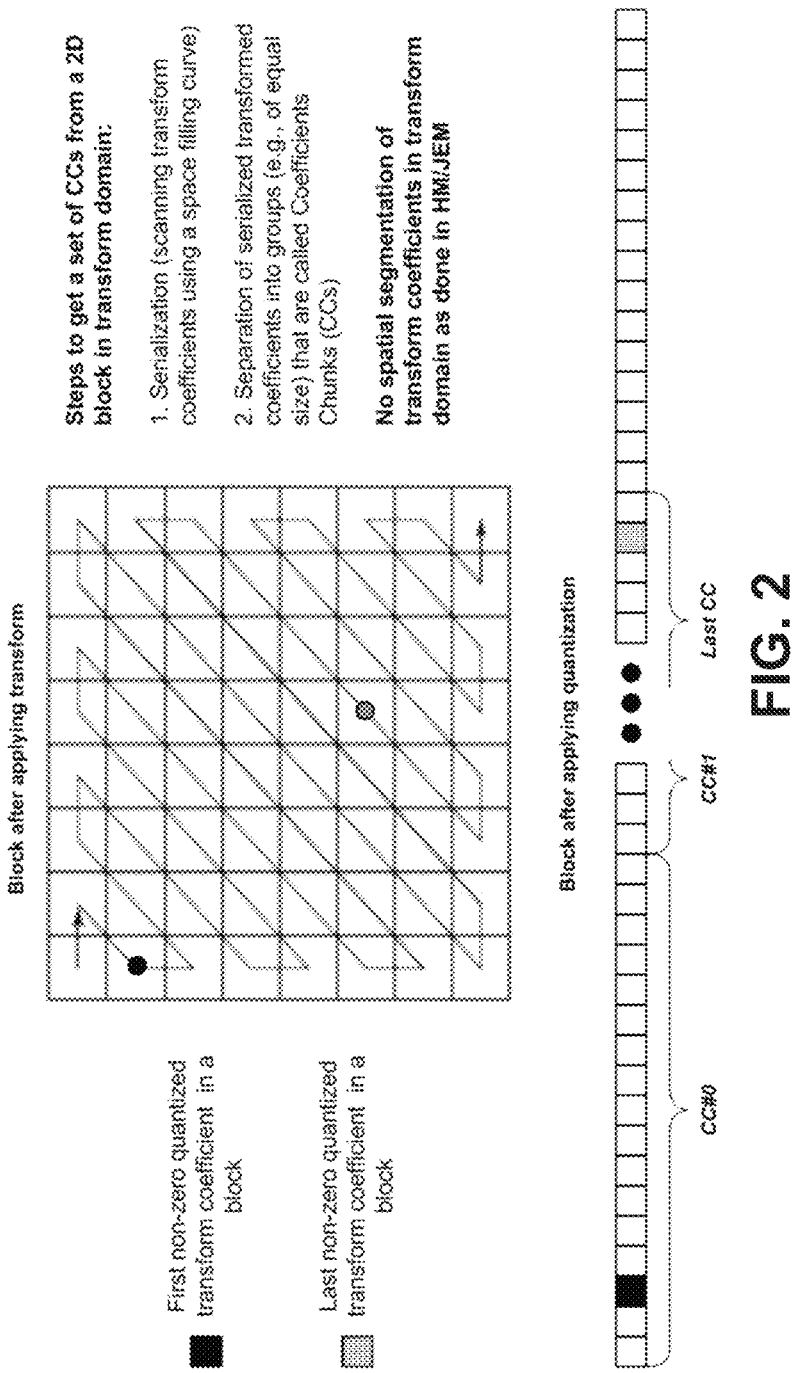
FIG. 2 is a diagram illustrating the separation of a TU into CCs.

In the drawings, identical reference signs refer to identical or at least functionally equivalent features.

DETAILED DESCRIPTION

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks, and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" or "image" and equivalent the term "picture data" or "image data" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 7 to 9 (before describing embodiments of the disclosure in more detail based on FIGS. 10 to 16).

Figure 7:
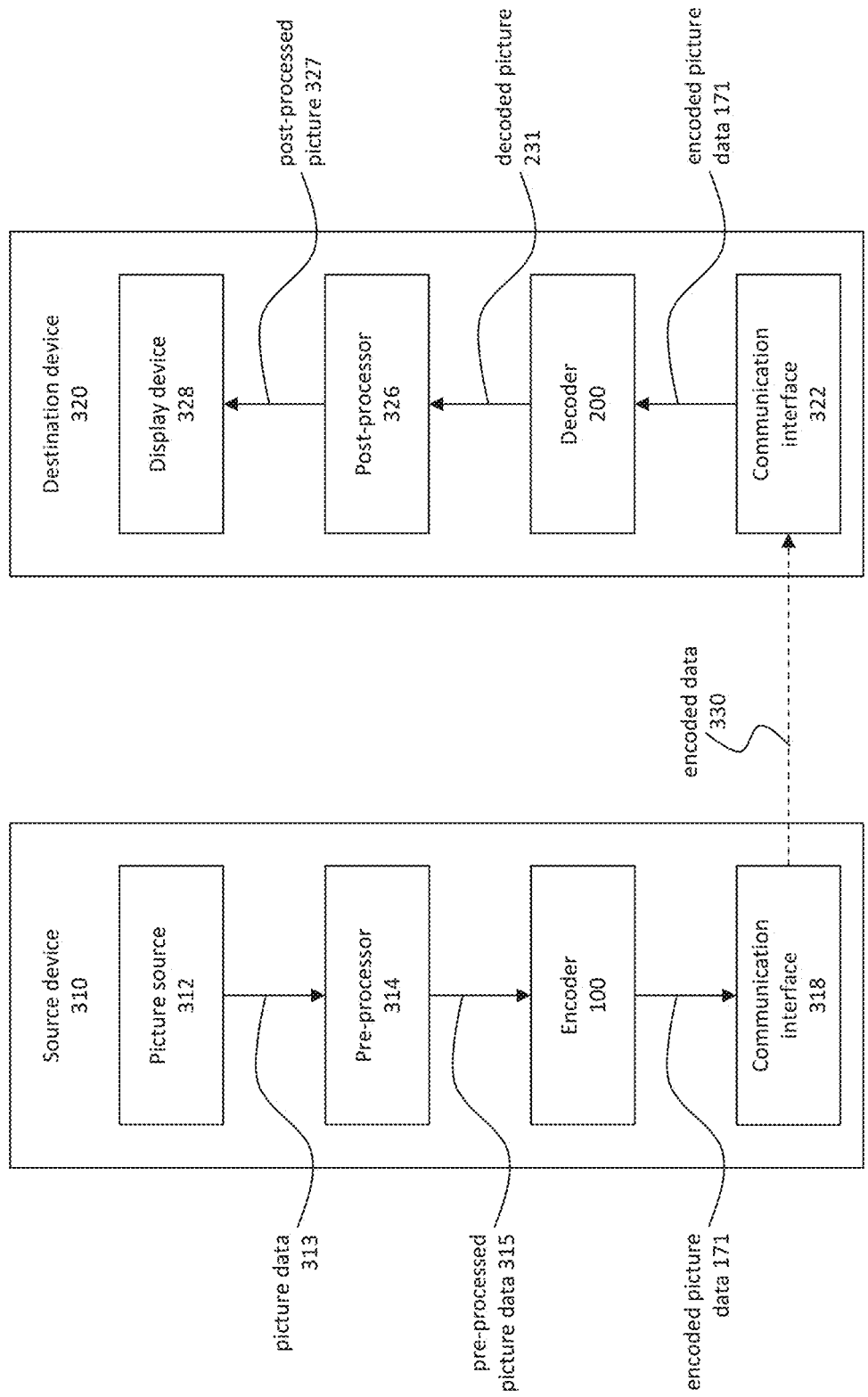
FIG. 7 is a block diagram showing an example of a video coding system configured to implement embodiments of the disclosure.

FIG. 7 is a conceptional or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures or images and any other kind of picture or image will be referred to as "picture" "image" or "picture data" or "image data", unless specifically described otherwise, while the previous explanations with regard to the terms "picture" or "image" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318.

Interfaces between units within each device include cable connections, USB interfaces, communication interfaces 318 and 322 between the source device 310 and the destination device 320 include cable connections, USB interfaces, and radio interfaces.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 8).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326, and a display device 328.

The communication interface 322 of the destination device 320 is configured to receive the encoded picture data 171 or the encoded data 330, e.g. directly from the source device 310 or from any other source, e.g. a memory, e.g. an encoded picture data memory.

The communication interface 318 and the communication interface 322 may be configured to respectively transmit/receive the encoded picture data 171 or encoded data 330 via a direct communication link between the source device 310 and the destination device 320, e.g. a direct wired or wireless connection, including optical connection or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 7 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 9).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display, such as projectors, holographic displays, apparatuses to generate holograms . . . .

Although FIG. 7 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 7 may vary depending on the actual device and application.

In the following, a few non-limiting examples for the coding system 300, the source device 310 and/or destination device 320 will be provided.

Various electronic products, such as a smartphone, a tablet, or a handheld camera with integrated display, may be seen as examples for a coding system 300. They contain a display device 328 and most of them contain an integrated camera, i.e. a picture source 312, as well. Picture data taken by the integrated camera is processed and displayed. The processing may include encoding and decoding of the picture data internally. In addition, the encoded picture data may be stored in an integrated memory.

Alternatively, these electronic products may have wired or wireless interfaces to receive picture data from external sources, such as the internet or external cameras, or to transmit the encoded picture data to external displays or storage units.

On the other hand, set-top boxes do not contain an integrated camera or a display but perform picture processing of received picture data for display on an external display device. Such a set-top box may be embodied by a chipset, for example.

Alternatively, a device similar to a set-top box may be included in a display device, such as a TV set with integrated display.

Surveillance cameras without an integrated display constitute a further example. They represent a source device with an interface for the transmission of the captured and encoded picture data to an external display device or an external storage device.

Devices such as smart glasses or 3D glasses, for instance used for AR or VR, represent a destination device 320. They receive the encoded picture data and display them.

Therefore, the source device 310 and the destination device 320 as shown in FIG. 7 are just example embodiments of the disclosure and embodiments of the disclosure are not limited to those shown in FIG. 7.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like. For large-scale professional encoding and decoding, the source device 310 and/or the destination device 320 may additionally comprise servers and work stations, which may be included in large networks. These devices may use no or any kind of operating system.

Encoder & Encoding Method

Figure 8:
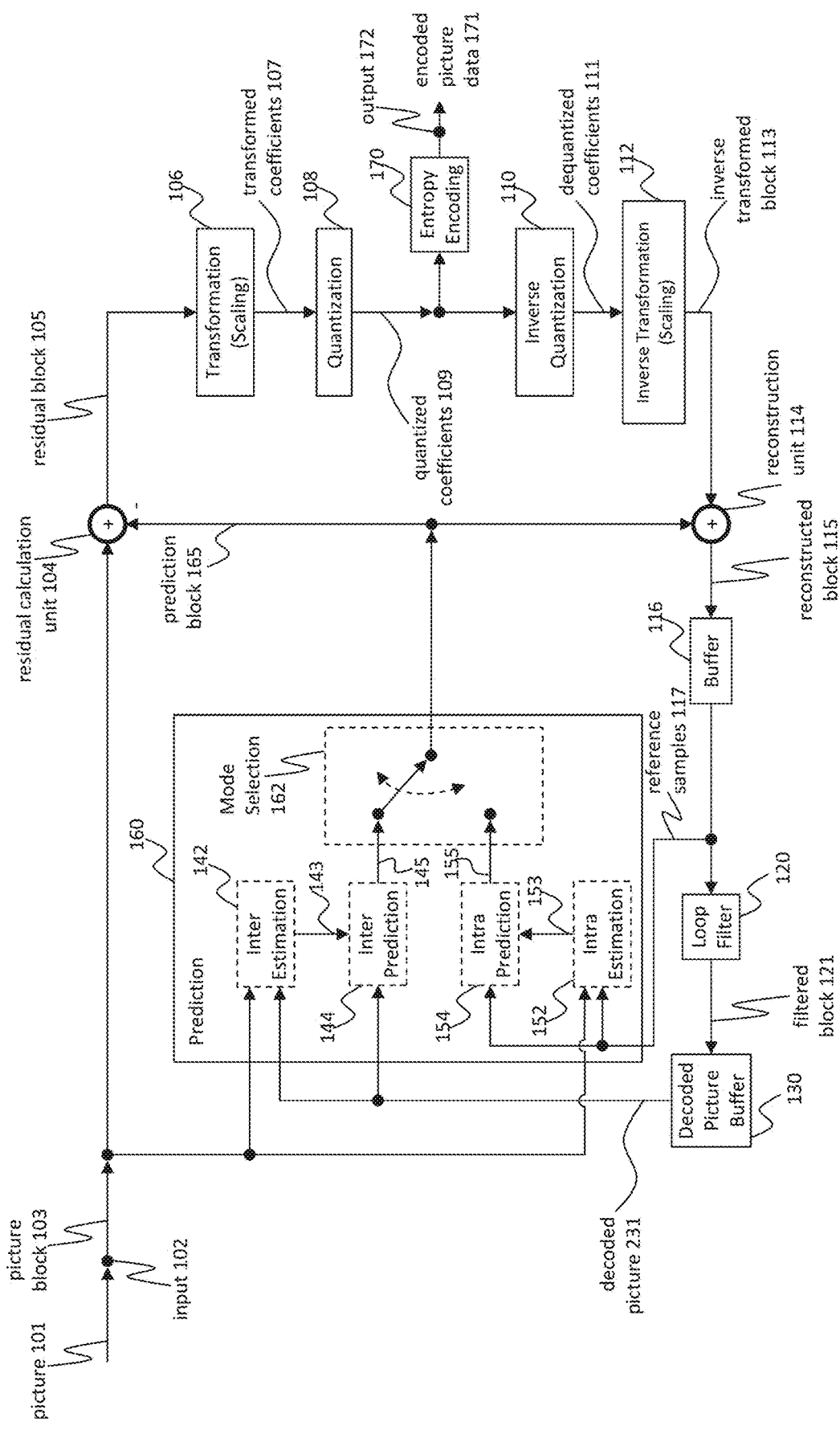
FIG. 8 is a block diagram showing an example of a video encoder.

FIG. 8 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a decoded picture buffer (DPB) 130, a prediction unit 160, which includes an inter estimation unit 142, an inter prediction unit 144, an intra-estimation unit 152, an intra-prediction unit 154 and a mode selection unit 162, an entropy encoding unit 170, and an output 172. A video encoder 100 as shown in FIG. 8 may also be referred to as hybrid video encoder or a video encoder according to a hybrid video codec. Each unit may consist of a processor and a non-transitory memory to perform its processing steps by executing a code stored in the non-transitory memory by the processor.

Figure 9:
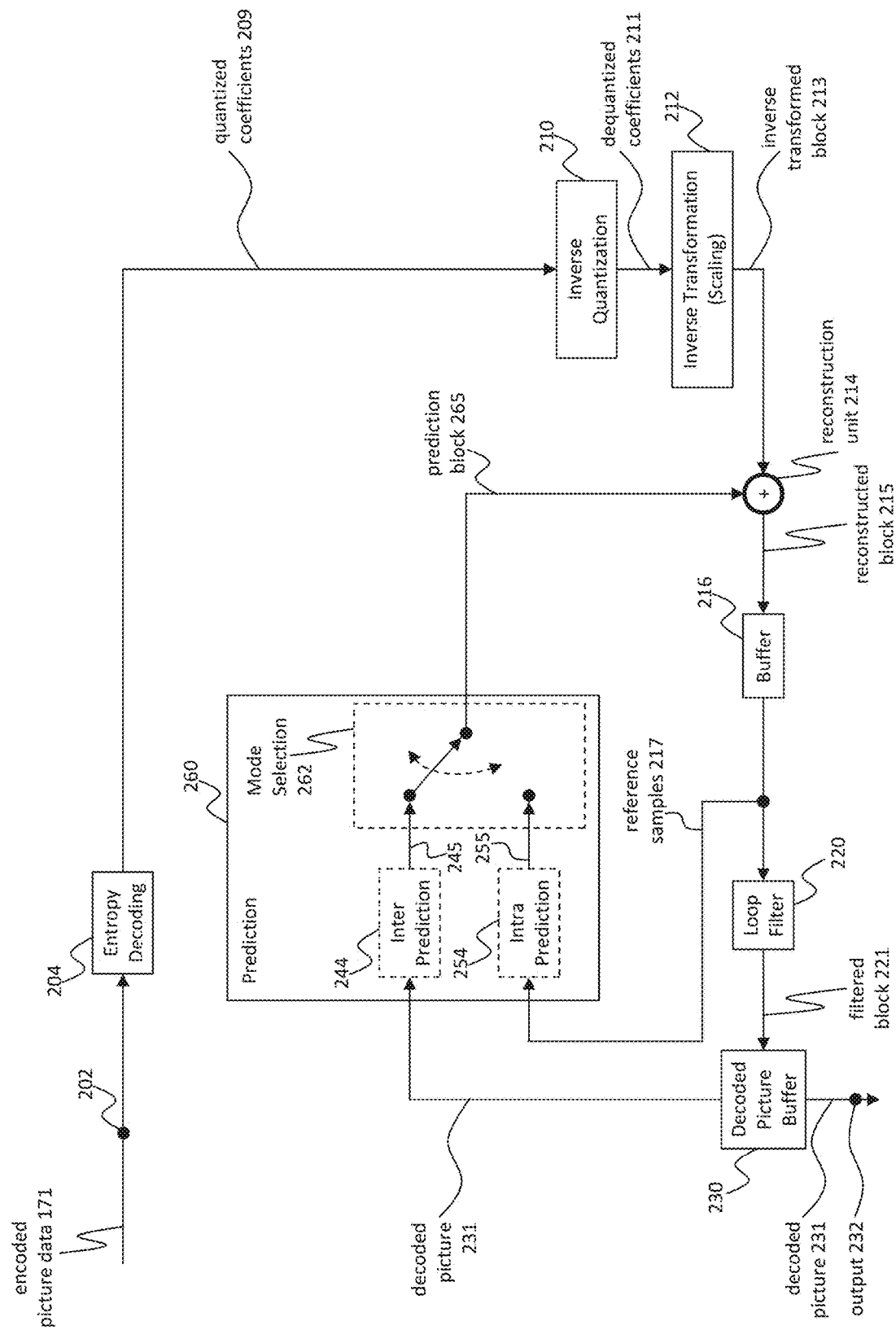
FIG. 9 is a block diagram showing an example structure of a video decoder.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 116, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder to provide inverse processing for identical reconstruction and prediction (see decoder 200 in FIG. 9).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Embodiments of the encoder 100 may comprise a partitioning unit (not depicted in FIG. 8), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Each block of the plurality of blocks may have square dimensions or more general rectangular dimensions. Blocks being picture areas with non-rectangular shapes may not appear.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 8 is configured to encode the picture 101 block by block, e.g. the encoding and prediction is performed per block 103.

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

The transformation unit 106 is configured to apply a transformation, e.g. a spatial frequency transform or a linear spatial transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC (High-Efficiency Video Coding), may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108) may be configured to output the quantization settings including quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120, and/or such that, e.g. the buffer unit 116 and the decoded picture buffer unit 130 form one buffer. Further embodiments may be configured to use filtered blocks 121 and/or blocks or samples from the decoded picture buffer 130 as input or basis for intra estimation 152 and/or intra prediction 154.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121.

Embodiments of the loop filter unit 120 may comprise a filter analysis unit and the actual filter unit, wherein the filter analysis unit is configured to determine loop filter parameters for the actual filter. The filter analysis unit may be configured to apply fixed pre-determined filter parameters to the actual loop filter, adaptively select filter parameters from a set of predetermined filter parameters or adaptively calculate filter parameters for the actual loop filter.

Embodiments of the loop filter unit 120 may comprise one or a plurality of filters (such as loop filter components and/or subfilters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the disclosure may also be configured to use the previously filtered blocks and corresponding filtered sample values of the decoded picture buffer 130 for any kind of estimation or prediction, e.g. intra estimation and prediction as well as inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least fulfills a prediction mode selection criterion.

In the following, the prediction processing (e.g. prediction unit 160) and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (possible) inter-prediction modes depend on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). For example, a video sequence may comprise the current picture and the previously decoded pictures 231, or in other words, the current picture and the previously decoded pictures 231 may be part of or form a sequence of pictures forming a video sequence.

The encoder 100 may, e.g., be configured to select (obtain/determine) a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 8 shows two distinct units (or steps) for the inter-coding, namely inter estimation 142 and inter prediction 152, both functionalities may be performed as one (inter estimation typically requires/comprises calculating an/the inter prediction block, i.e. the or a "kind of" inter prediction 154), e.g. by testing all possible or a predetermined subset of possible inter prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select (obtain/determine) an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 8 shows two distinct units (or steps) for the intra-coding, namely intra estimation 152 and intra prediction 154, both functionalities may be performed as one (intra estimation typically requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

Decoder and Decoding Methods

FIG. 9 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, which includes an inter prediction unit 244, an intra prediction unit 254, and a mode selection unit 260, and an output 232.

The entropy decoding unit 204 is configured to perform entropy decoding to the encoded picture data 171 to obtain, e.g., quantized coefficients 209 and/or decoded coding parameters, e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an intra prediction unit 254, wherein the inter prediction unit 244 may be identical in function to the inter prediction unit 144, and the intra prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 231, e.g. via output 232, for presentation or viewing to a user.

Referring back to FIG. 7, the decoded picture 231 output from the decoder 200 may be post-processed in the post-processor 326. The resulting post-processed picture 327 may be transferred to an internal or external display device 328 and displayed.

Further Details of Embodiments

In the following, further details of exemplary embodiments of the present disclosure will be described with reference to the drawings of FIGS. 10 to 16.

The particular harmonization of sign bit hiding (SBH) and residual sign prediction (RSP) techniques provided by the present disclosure comprises separating the RSP procedure into the two sub-procedures of preparing RSP lists (at least one list, in specific embodiments: two or more lists) and performing other actions related to the RSP technique, in particular, performing sign estimation and obtaining and encoding the difference between estimated signs and original signs. In between these two sub-procedures, SBH is performed. In particular, a coefficient to which SBH is to be applied is thus no longer selected statically (such as the first non-zero transform coefficient in a predetermined scanning order) but the selection is made so that a coefficient is selected which is not already predicted by means of the RSP technique, i.e. which is not in the RSP list or lists.

This requires additional encoder-side modifications of the SBH procedure by putting constraints on allowed changes of quantized transform coefficients from RSP lists.

The disclosure proposes both normative (i.e. applicable at least to the decoder, in particular: to both decoder and encoder) and non-normative (i.e. applicable to the encoder only) improvements that harmonize sign prediction and hiding processes at the encoder and decoder sides. In the present case, the normative improvements are introduced to both encoding and decoding processes. In embodiments, further non-normative modifications are necessary on the encoder side in order to properly enable the decoder side to parse and decode a signal received from the encoder side. Of course, a decoder according to the present disclosure should be able to decode any signal that has been encoded by an encoder according to the present disclosure.

Figure 10:
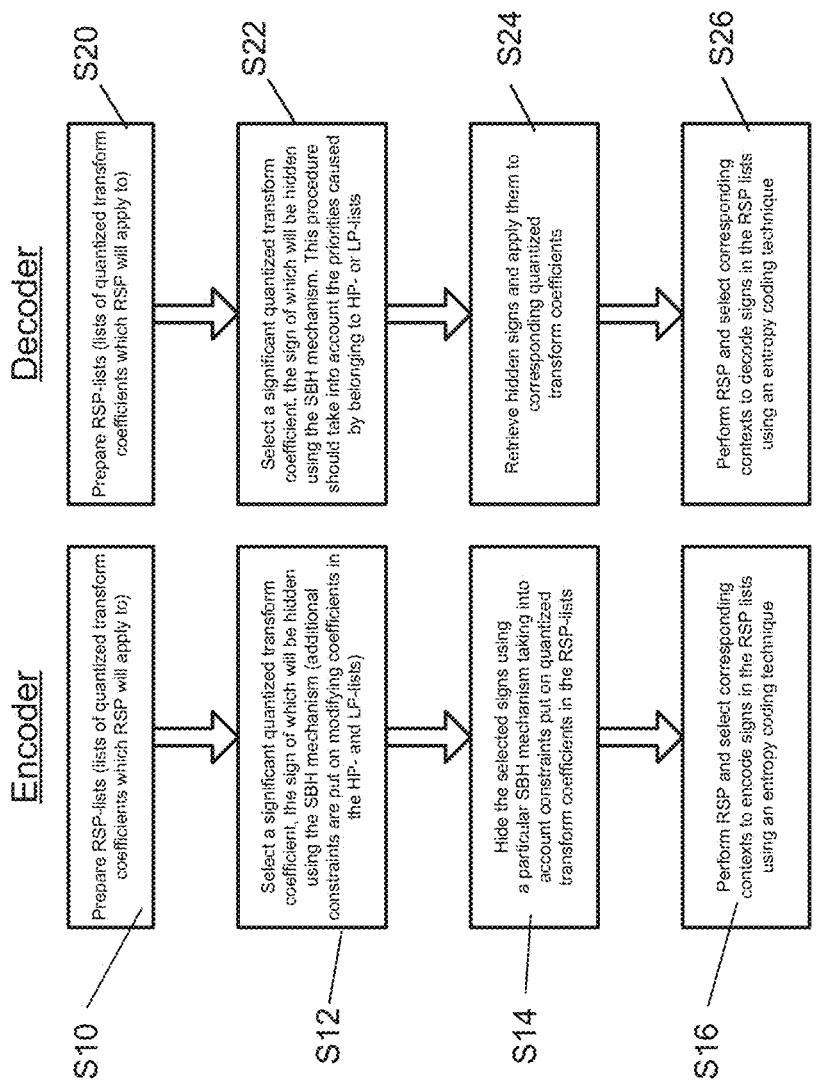
FIG. 10 illustrates a data flow of the encoder and decoder with harmonized sign prediction and hiding process according to embodiments of the present disclosure.

A processing flow of the modified procedure of harmonizing and applying SBH and RSP on both the encoder and decoder sides is illustrated in FIG. 10.

On the encoder side, the first step (S10) is to prepare one or more RSP-lists, i.e. list of coefficients the signs of which are to be estimated (predicted). In the present example this includes HP- and LP-lists as examples of sub-lists of a RSP list. In the following description, for simplicity they will also be designated as "RSP lists". LP- and HP-lists have been described above in connection with the general explanation of the RSP technique. These lists are constructed by defining an overall size of the lists (M) and thresholding the parsed magnitude values of the first M coefficients ordered by magnitude and scanning them (e.g. in raster order).

The next step (S12) is different from the conventional approach in that the position of the coefficient with the sign to be hidden (embedded) is no longer defined as the position of the first non-zero coefficient within a scan order. If a coefficient belongs to the RSP lists, its sign shall not be selected for hiding because it already undergoes an encoding and signaling procedure with enhanced compression (the RSP technique). Otherwise, the same data would be encoded using two different techniques simultaneously, i.e. in a redundant way. According to an embodiment of the present disclosure, the position of the coefficient is selected, the sign of which is embedded and restored with the SBH mechanism to be the most low-frequency (significant) one that is not in the lists. Positions corresponding to coefficients belonging to the RSP lists are excluded from this selection process.

As in the conventional case, at the encoder side, the SBH technique should guarantee that for a given set of coefficients (CC or CG) the value of a sign being hidden corresponds to the value of a check function (predetermined function) applied to this set. This property of the quantized residual signals is achieved during quantization process, typically by modifying magnitudes of quantized transform coefficients.

In particular, if a coefficient belongs to the RSP-lists (HP- and LP-lists), then modification of its magnitude is allowed only if the threshold value between HP and LP is not crossed. Otherwise, because different contexts are applied in coding the sign differences between estimated and true signs for the two sub-lists, the decoder would not be able to correctly decode the received encoded difference values between estimated and correct signs. This constraint is taken into account when performing the hiding process of the selected signs in step S14.

In the following step S16, the actual RSP procedure (sign estimation and encoding of the differences) is performed. This can be done by any of the known methods described in the introductory portion above, or alternatively by other suitable methods such as the one described below with reference to FIG. 14.

On the decoder side, the first two steps coincide with the encoding process. At first, in step S20, the RSP-list(s) is/are prepared. In particular, this can be done on the basis of a preset size (M) and ordering the coefficients in descending order in accordance with magnitude, as described above. On both encoder and decoder sides, other suitable mechanisms are possible as well.

In subsequent step S22, a significant quantized transform coefficient is selected for restoring its sign on the basis of the value of a predetermined function, according to an SBH mechanism. The coefficient is selected so as not to be included in the RSP-list(s) (HP- or LP-lists), same as on the encoder side. In particular, the coefficient is selected on the basis of the same rule as on the encoder side, such as the most low-frequency one that is not in the list.

The final steps of the sign decoding process, determining the sign of the coefficient to which SBH is applied (S24) and performing the RSP-procedure including decoding the difference values between estimated and original signs, performing the sign estimation procedure and correcting the estimated signs on the basis of the decoded difference values (S26) are performed in the conventional manner.

Figure 11:
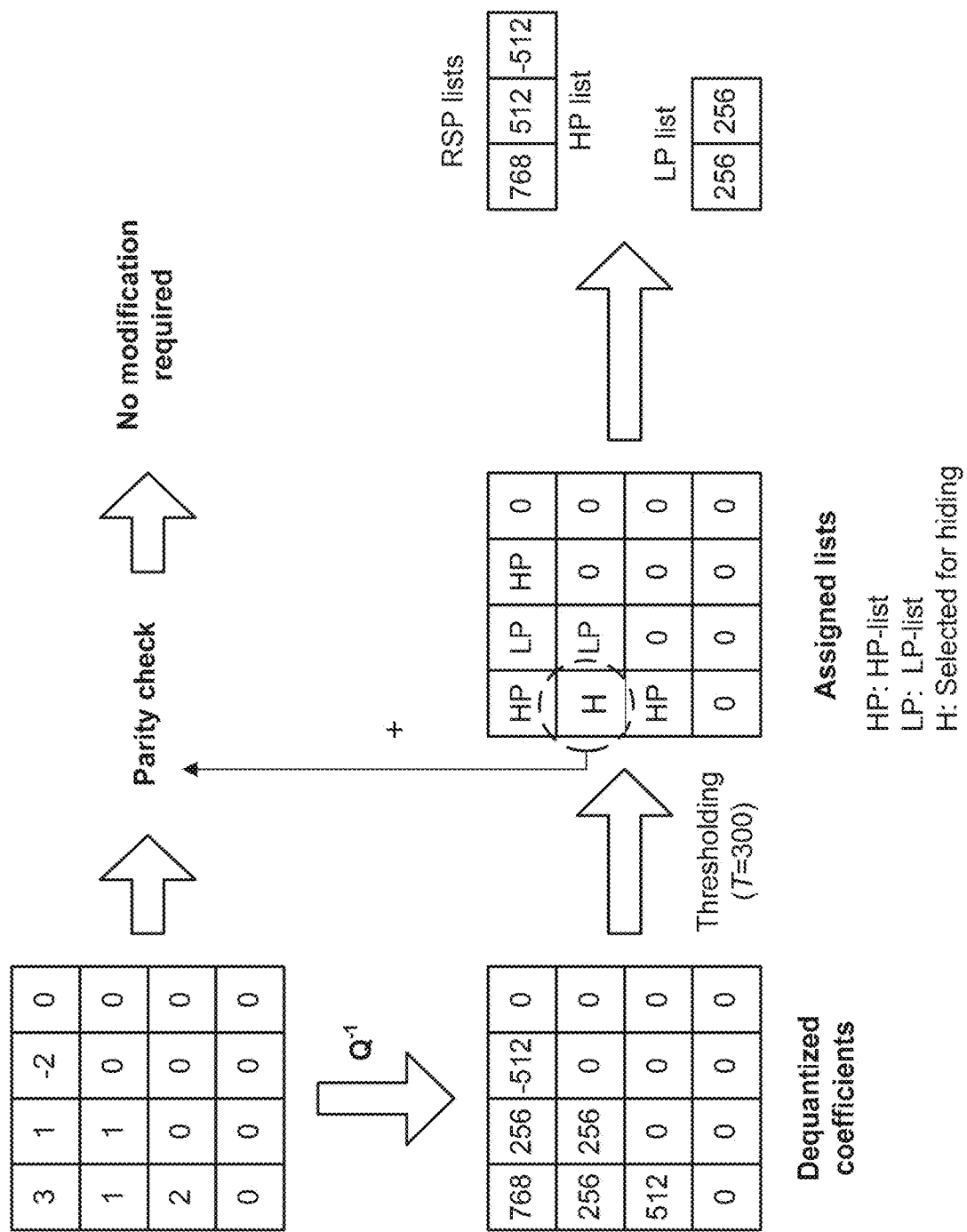
FIG. 11 gives an example of harmonization of SBH and prediction lists generation according to embodiments of the disclosure.

FIG. 11 illustrates an exemplary case of harmonization between sign hiding and sign prediction as performed in steps S10 and S12 and steps S20 and S22, respectively.

The upper left portion of the drawing shows a set of quantized transform coefficients, in this case a 4×4 coefficient group. The coefficient group is de-quantized and thresholding is applied with a threshold value of T=300 to the restored (i.e. de-quantized) coefficients. In the given example, the overall number of coefficients in the RSP list is defined as M=5. Accordingly, the coefficient positions corresponding to coefficient values of 768, 512, and −512, having a magnitude larger than the threshold of 300, belong to the HP-sublist. Consequently, there remains a number of 5−3=2 coefficients to populate the LP-sublist. More specifically, out of the remaining three significant coefficients, each having a magnitude of 256, only two are included in the LP-sublist. The remaining coefficient with magnitude 256 not included in the RSP list (in this example: the only remaining significant coefficient of the coefficient group) is thus selected for hiding by SBH. Although in principle the thresholding could also be performed with the quantized coefficients, performing it in the domain of restored coefficients has the advantage of being independent of block size and quantization parameter.

A parity check reveals that no modification of the coefficients is required in this example. Namely, the sum of the absolute values of the quantized transform coefficients is 3+1+2+1+1+2=10, i.e. an even number. This corresponds to the sign (+) of the coefficient selected for hiding.

Figure 12:
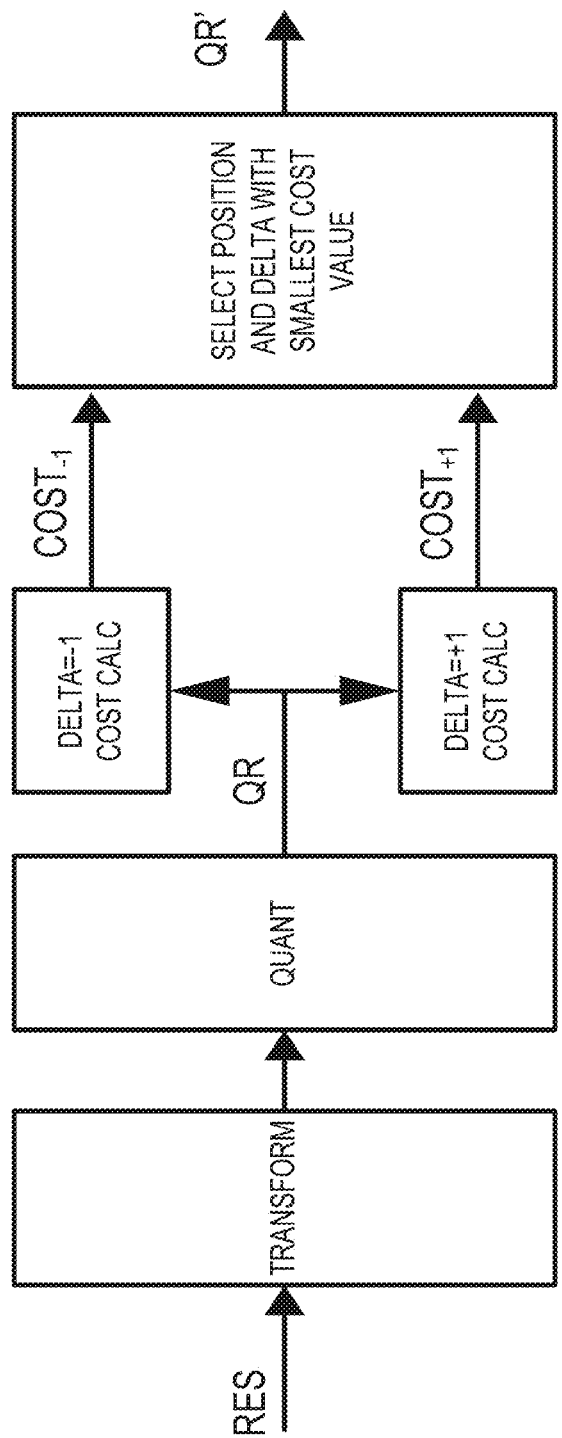
FIG. 12 illustrates the determination of the best coefficient modification in RD sense.

FIG. 12 describes a conventional example of the determination of the best coefficient modification (if necessary to obtain the desired value of the predetermined function so as to correspond to the correct sign to be hidden). For sake of simplicity, the case of a single coefficient to be hidden, by means of calculating a parity value of the sum of the transform coefficients after quantization is considered, i.e. the necessary modification can be achieved by modifying a single arbitrary one of the coefficients by either +1 or −1.

As usual, the residual signal (RES) which is obtained as a difference of the original and predicted block is transformed (generally, using orthogonal transform such as DCT or DST). The resulting transform coefficients are further quantized with a pre-defined quantization parameter value. The quantization procedure can be performed in different ways. However, the most common one is a rate-distortion optimized quantization (RDOQ). It uses CABAC statistics in order to minimize not only quantization error, but also the number of bits that are required to encode the resulting quantized signal. The quantization parameter is used by RDOQ to determine the most RD-beneficial coefficient modification. In the case when the check function is a parity check function, as assumed here, the desired check function value would always be achieved either by increasing or decreasing the magnitude of one of the coefficients belonging to the set of coefficients which the check function is applied to.

SBH technique at the encoder side operates with the quantized transform coefficients QR and uses a technique similar to RDOQ to determine the most RD-beneficial coefficient modification. For the case when check function is a parity check function, the desired check function value could always be achieved either by increasing or decreasing the magnitude of one of coefficients belonging to the set of coefficients to which the check function is applied.

In the exemplary implementation shown in FIG. 12, for each of the coefficient positions to which the check function is applied, the cost values are calculated: cost of increase ($COST_{-1}$) and cost of decrease ($COST_{+1}$). The results are compared with each other and the position and direction of amendment (+ or −1) having the smallest cost value is selected. Thus, in the described example, the lowest modification cost determines a position and direction of modification ($pos_{best}$) of the quantized transform coefficients magnitude.

As indicated above, some modifications of the quantized transform coefficients are prohibited, e.g. those leading to the alteration of the position on which a sign will be restored at the decoder side. Such constraints have been discussed in detail above.

In view of the constraints, there may be a situation, wherein the modification (position and direction of amendment) resulting in the smallest cost value is prohibited by the constraints and cannot therefore be selected. A straightforward rule to be applied in order to select the modification in view of this is to select the modification having the second smallest cost value (or more generally, the smallest cost value that is not prohibited by the constraints).

However, although the above approach can be applied in the framework of the present disclosure, it turns out that in the framework of the presence of sign hiding and sign prediction techniques in the coding process a pure cost-based optimization becomes suboptimal. In fact, many coefficients have close cost of modification because the cost function is normally not exactly calculated but estimated.

Therefore, embodiments of the present disclosure apply an alternative approach to modify a coefficient's magnitude at the encoder side. This will be described below with reference to FIG. 13.

In the first step (S130), an RD-cost calculation for the individual coefficient modifications is performed. This can be implemented in the manner described above with reference to FIG. 12.

Figure 13:
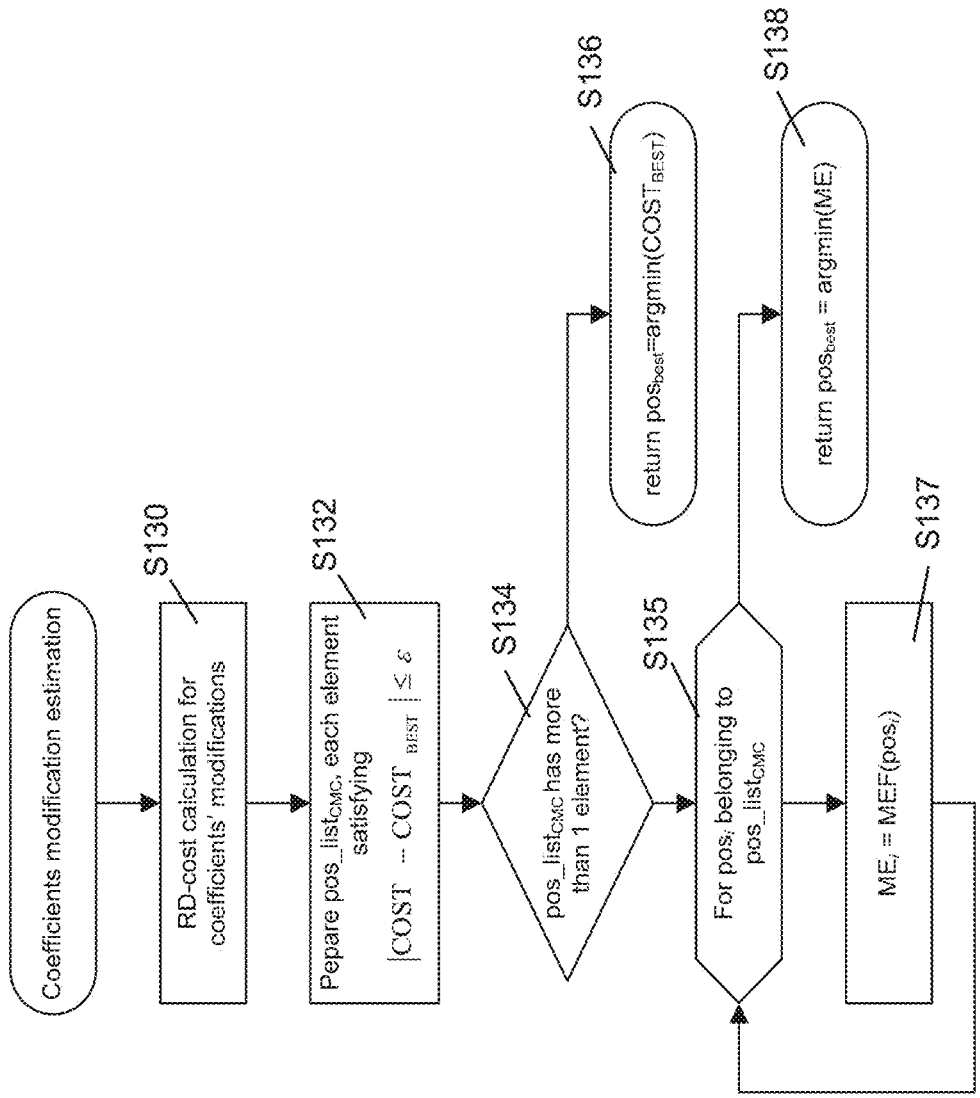
FIG. 13 illustrates an alternative concept for determining the best coefficient modification.

The second step (S132) of FIG. 13 consists in preparing a list of modifications $pos\_list_{CMC}$ (modification is defined by coefficient's position and change direction) that provide RD-cost values that are close to the best (minimum) cost value. The criterion to define whether cost is close enough should be defined as $$|COST - COST_{BEST}| \leq \varepsilon,$$

where $\varepsilon$ is a predefined value.

It is then determined (S134) whether the thus generated list has more than one element. If there's only a single element (i.e. corresponding to the cost value $COST_{BEST}$), then the corresponding position and change direction is selected (S136) and as the optimal modification ($pos_{best}$), in the conventional manner.

If, however, the list comprises more than one element, i.e. there are plural possible modifications (position and change direction) having cost values close to the best (minimum) cost value, another criterion is further taken into account, by considering a modification estimation function (MEF). The modification $pos_{best}$ may then be substituted by another position and modification direction providing a lesser value of the modification estimation function. More specifically, for each member of the list (S135), the modification estimation function is calculated (S137), and the one having the smallest value of the modification estimation function is selected as the (new) optimal modification ($pos_{best}$).

According to an embodiment, MEF is defined to be a distortion introduced by coefficient modification. Rate change does not affect the accuracy of the RSP procedure, but distortion does. Therefore, it is avoided to use a rate change value in MEF.

Another embodiment defines a MEF to be a quantized level of the coefficient. In order to maximize the number of coefficients the signs of which are predicted, the coefficient with the highest magnitude is selected out of the $pos\_list_{CMC}$ list.

Figure 3:
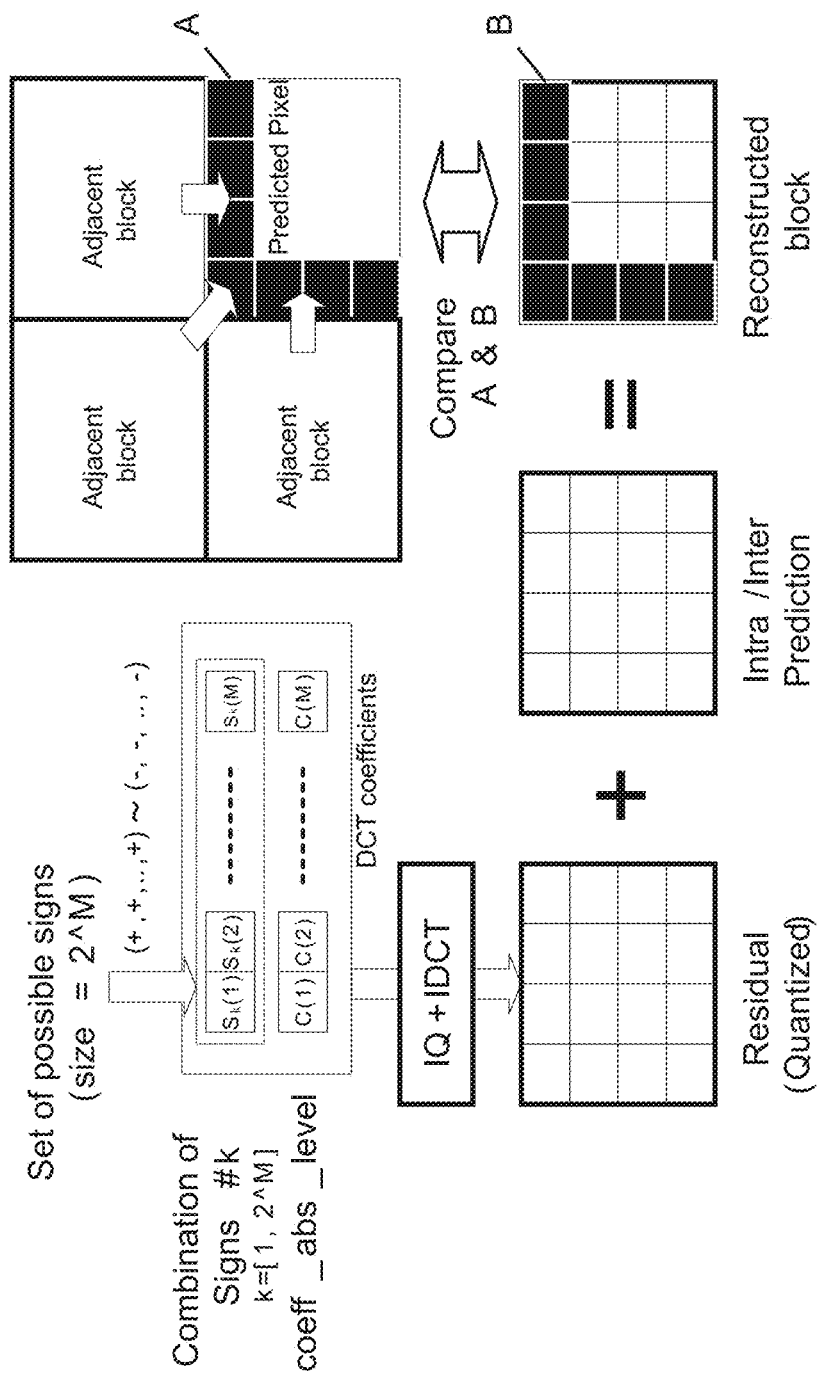
FIG. 3 gives an overview of a procedure of sign estimation by means of a cost function in the pixel domain.
Figure 4:
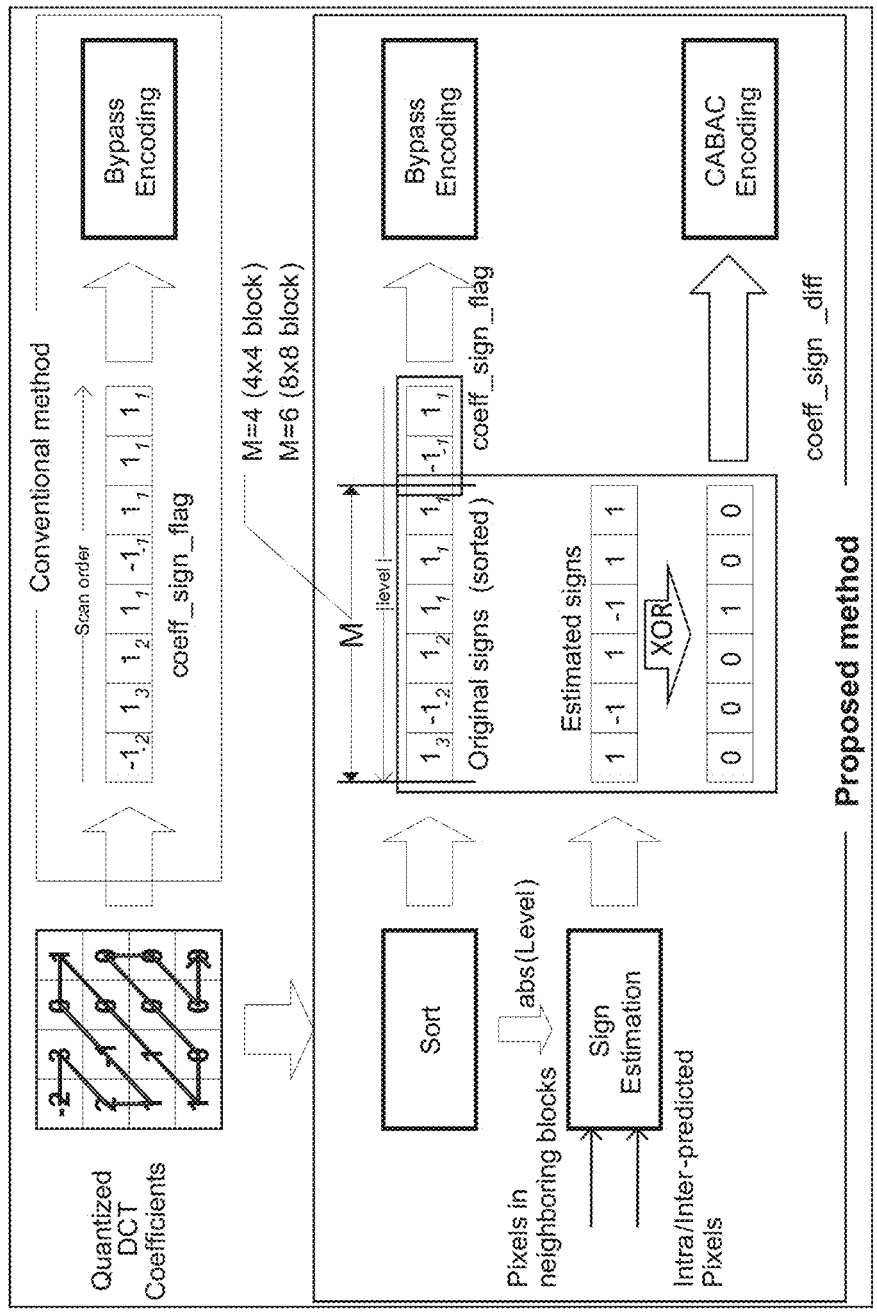
FIG. 4 illustrates a comparison of conventional sign coding with the technique of FIG. 3.
Figure 5:
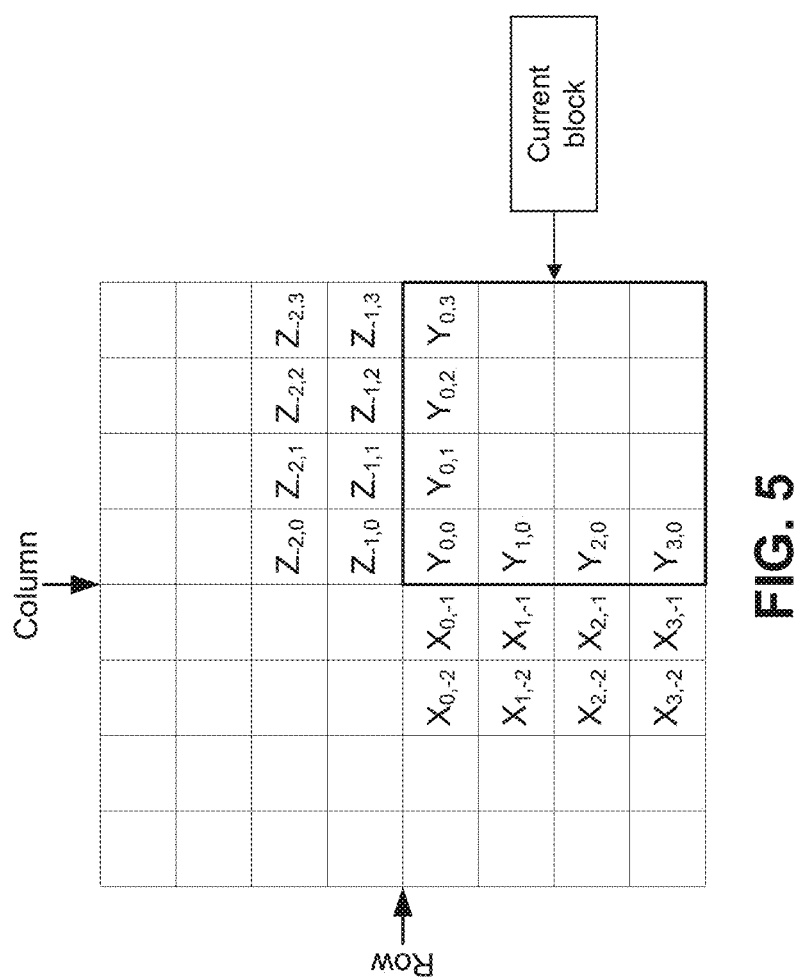
FIG. 5 illustrates examples of pixels used to derive cost values according to a known technique.
Figure 6:
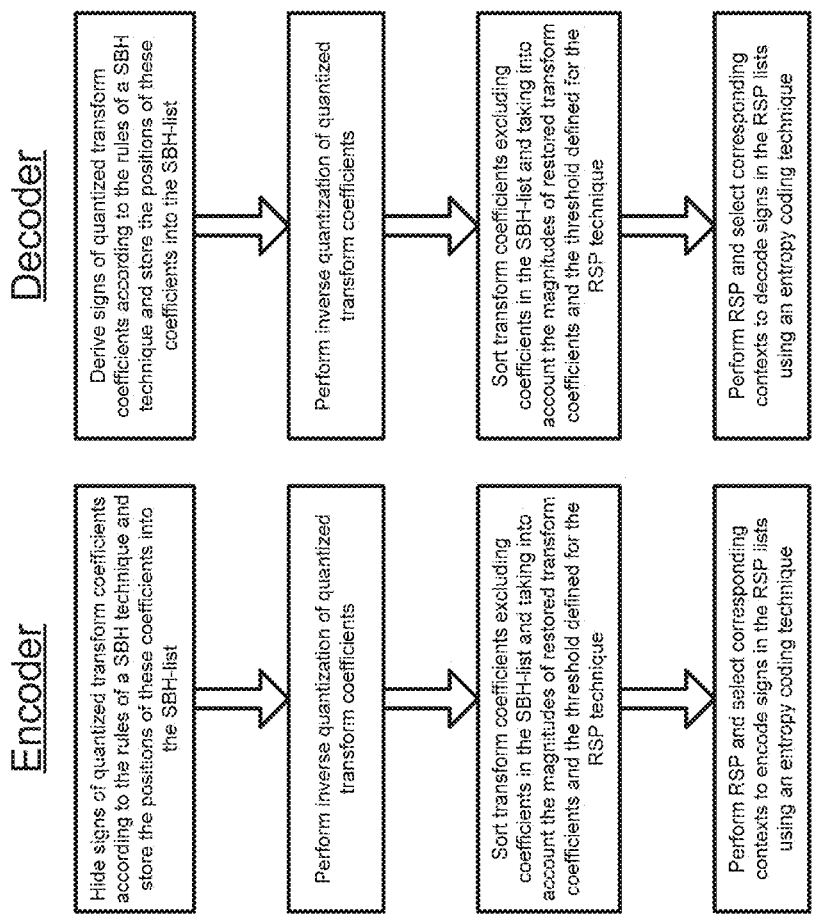
FIG. 6 illustrates a procedure of harmonization of RSP and SBH.

In the following, with reference to FIG. 14, an alternative approach will be described for performing the sign estimation procedure in the frequency domain (transform domain). The major differences between the conventional method of an estimation procedure in the pixel domain described above with reference to FIG. 3 become evident by comparing FIG. 14 with FIG. 3. In particular:

sign estimation is performed in transform domain, and the prediction signal is propagated into the adjacent block area instead of reconstructing the current block and subtracting its boundary pixels from the corresponding pixels of adjacent blocks.

Figure 14:
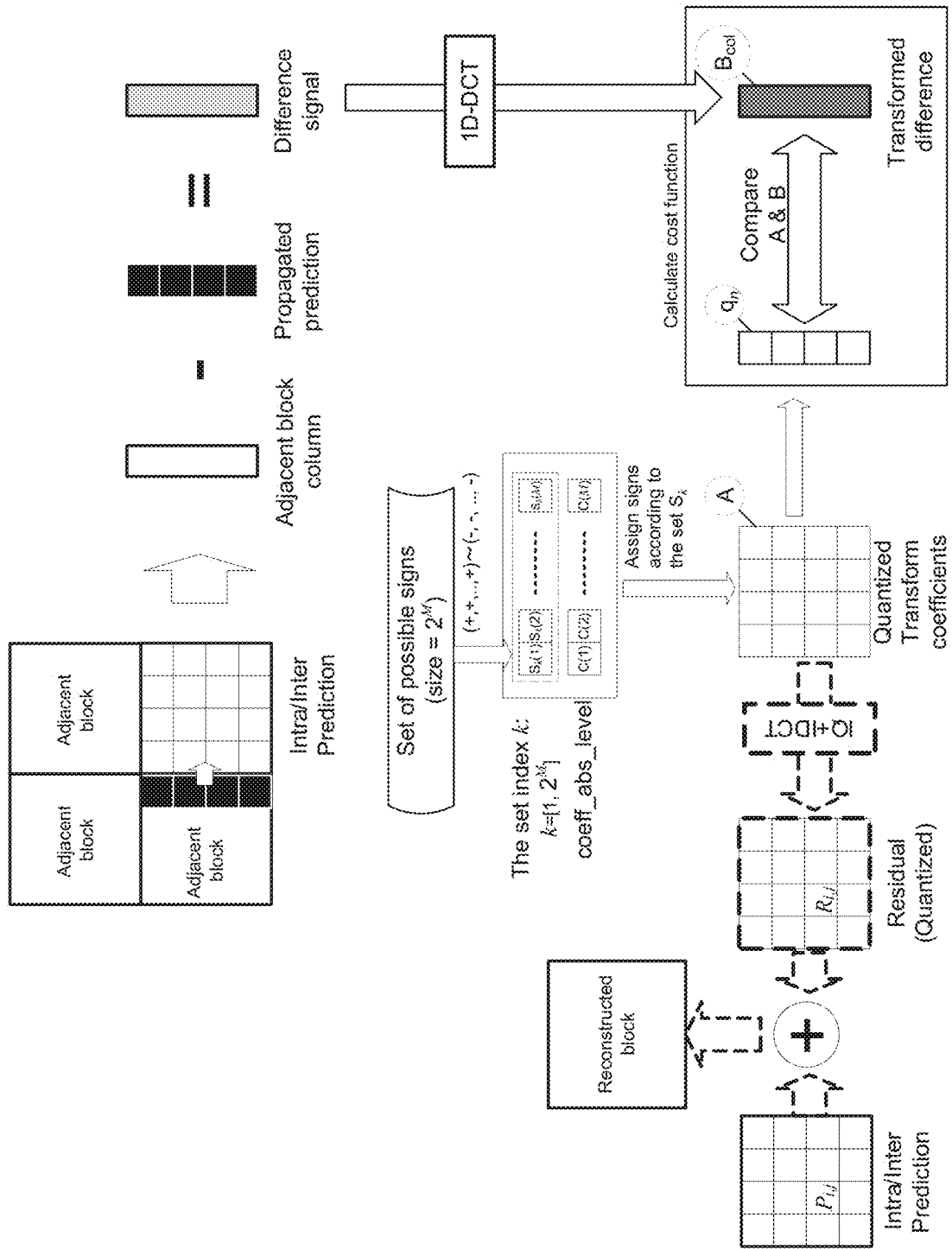
FIG. 14 illustrates an alternative frequency-domain sign estimation concept, according to embodiments of the present disclosure.

For the sake of simplicity, only one column of the adjacent block is being considered in FIG. 14. Depending on the framework where an embodiment of the present disclosure is applied, the upper row, the right column or even the bottom row could be also used.

The cost function (1) is redefined to use squares instead of modulus:

$$F=\Sigma_{n=0}^{N-1}(2X_{n,-1}-X_{n,-2}-Y_{n,0})^2+\Sigma_{m=0}^{M-1}(2Z_{-1,m}-Z_{-2,m}-Y_{0,m})^2, \quad (1a)$$

where N and M are here height and width of the block.

A reconstructed block consists of prediction and residual parts:

$$Y_{i,j}=P_{i,j}+R_{i,j}$$

where $P_{i,j}$ is prediction, $R_{i,j}$ is residuals.

In this case components in (1a) can be rearranged:

$$F = \sum_{n=0}^{N-1} ([2X_{n,-1} - X_{n,-2} - P_{n,0}] - R_{n,0})^2 + \sum_{m=0}^{M-1} ([2Z_{-1,m} - Z_{-2,m} - P_{0,m}] - R_{0,m})^2$$

Let's denote $T_n=[2X_{n,-1}-X_{n,-2}-P_{n,0}]$, $V_m=[2Z_{-1,m}-Z_{-2,m}-P_{0,m}]$, $Q_n=R_{n,0}$ and $O_m=R_{0,m}$. According to Parseval's identity this function can be rewritten in transform domain (1D):

$$F=\Sigma_{n=0}^{N-1}(T_n-Q_n)^2+\Sigma_{m=0}^{M-1}(V_m-O_m)^2=\Sigma_{n=0}^{N-1}(t_n-q_n)^2+\Sigma_{m=0}^{M-1}(v_m-o_m)^2 \quad (2)$$

where $t_n$=Trans1D($T_n$), $q_n$=Trans1D($Q_n$), $v_n$=Trans1D($V_n$), $o_n$=Trans1D($O_n$), Trans1D( ) is a one-dimensional orthogonal transform.

As a result, the cost function can be calculated, and therefore, the signs of quantized transform coefficients can be estimated in transform domain.

As can be seen from FIG. 14, same as in the conventional approach described above with reference to FIG. 3, the respective calculation of the cost function (which corresponds to a kind of comparison between the predicted transformed difference signal and the calculated dequantized residual transform coefficients $q_n$) is performed for each of the $2^M$ hypotheses regarding the set of signs, and the hypothesis minimizing the cost function is taken as the estimation of the set of signs (wherein M is the number of transform coefficients for which the sign is to be predicted in the figures). In particular, the dequantized residual coefficients of block A corresponding to column $q_n$ at the boundary of block A to the adjacent block) are compared with the transformed difference column $B_{col}$. The transformed difference column $B_{col}$ (corresponding to $t_n$) is obtained by subtracting the propagated prediction signal from the adjacent block column obtaining the difference signal in the pixel domain and by transforming the difference signal into the transformed difference. The transformation is any orthogonal or near orthogonal transformation such as a transformation into a spectral domain, for example, a DFT, FFT, DCT or DST or their integer versions.

In order to determine the relation between $q_n$, $o_n$ and $r_{n,m}$=Trans2D ($R_{n,m}$), let's write out relation between $R_{n,m}$ and $r_{n,m}$ in the general form:

$$R_{n,m} = \sum_{k=0}^{N-1} W_N^{n,k} \sum_{l=0}^{M-1} W_M^{m,l} r_{k,l}$$

where $W_N^{n,k}$—transform core, as example, for DCT2 it is $$W_N^{n,k} = \frac{1}{\sqrt{N}} \cos\left(\frac{\pi(2n+1)k}{2N}\right) \begin{cases} 1, k = 0 \\ \sqrt{2}, k > 0 \end{cases}. \quad (3)$$

$$Q_n = R_{n,0} = \sum_{k=0}^{N-1} W_N^{n,k} \sum_{l=0}^{M-1} W_M^{0,l} r_{k,l}$$

$$q_k = \sum_{n=0}^{N-1} W_N^{n,k} R_{n,0} = \sum_{l=0}^{M-1} W_M^{0,l} r_{k,l},$$

In case of $o_n$ and $r_{n,m}$ there will be a similar relation.

Calculations in transform domain are computationally easier, because not all the available coefficients of $t_n$ and $v_m$ are used to calculate cost function. Instead, the method uses only several coefficients that belong to the specific row and specific column. This row and column are corresponding indices of a position of a coefficient, the sign of which is being predicted. A set of signs that minimizes cost function (2) is generated and taken as the estimation result. Sign prediction error is entropy encoded. The resulting bits are combined with the result of conventional sign encoding and is embedded into the bit stream.

Figure 15:
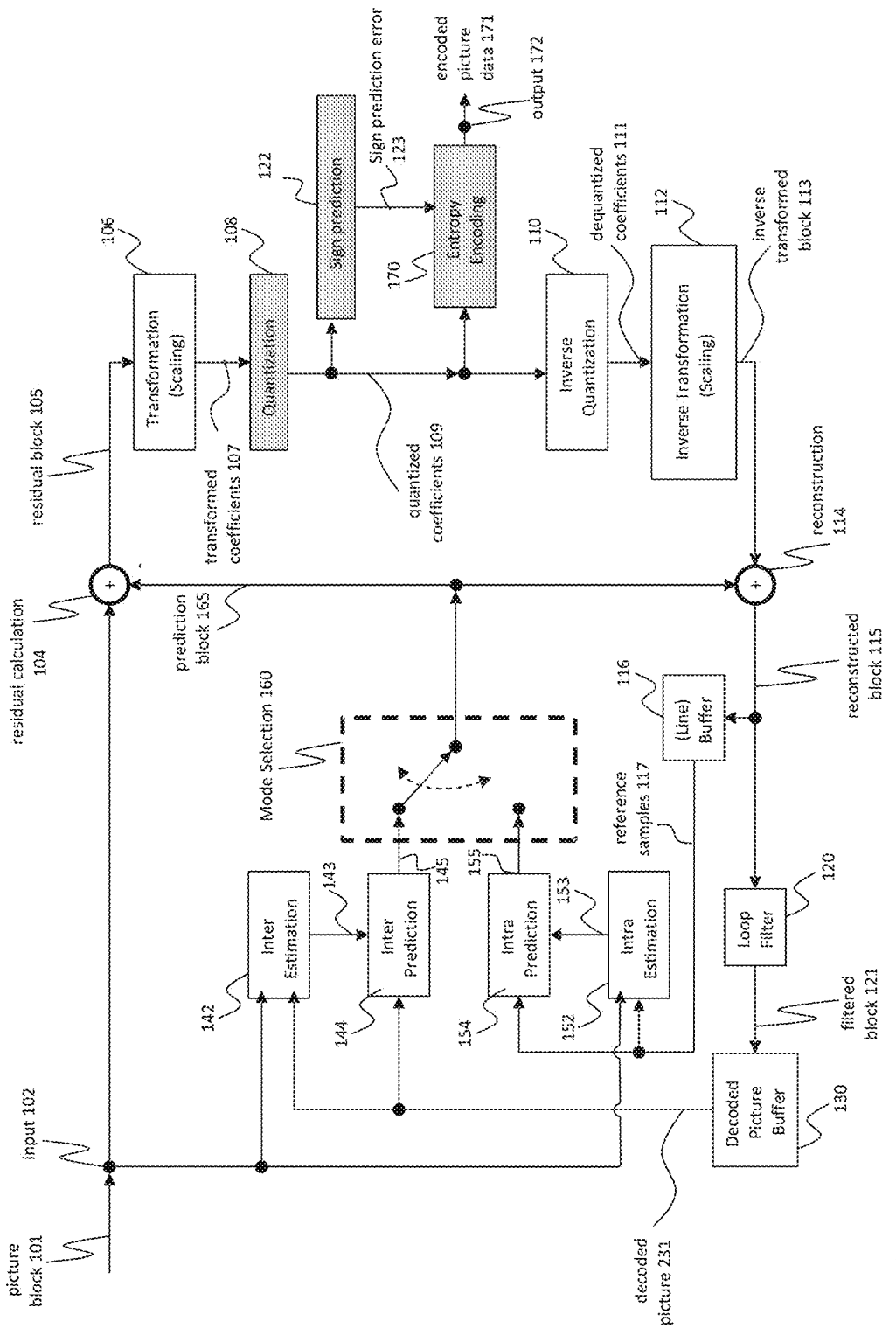
FIG. 15 gives an overview of an exemplary implementation of the disclosure at the encoder side.

An exemplary implementation of the present disclosure at the encoder side is illustrated in FIG. 15. The exemplary encoder according to the present disclosure illustrated in FIG. 15 differs from the conventional encoder of FIG. 8 by additionally including sign prediction (i.e. sign estimation) module (step or unit) 122. Based on the quantized transform coefficients 109, the module outputs sign prediction error 123 to entropy encoding module 170.

The entropy encoding module 170 itself differs from entropy encoding module 170 of FIG. 8 by two modifications. Firstly, the result of the sign estimation, i.e. the sign prediction error, is encoded instead of sign values for a set of given positions (first plurality of coefficients included in the list) within the transform unit of (quantized) transform coefficients. Secondly, new coding contexts are introduced that are applied to encode the result of the sign estimation.

Further, there is also a difference in the quantization module 108 between the embodiment of the present disclosure of FIG. 15 and the conventional encoder of FIG. 8. Namely, as indicated above, the quantization procedure shall ensure, by modifying coefficients if necessary, that the desired property of the check function (predetermined function) is fulfilled so as to hide the sign of a coefficient.

Figure 16:
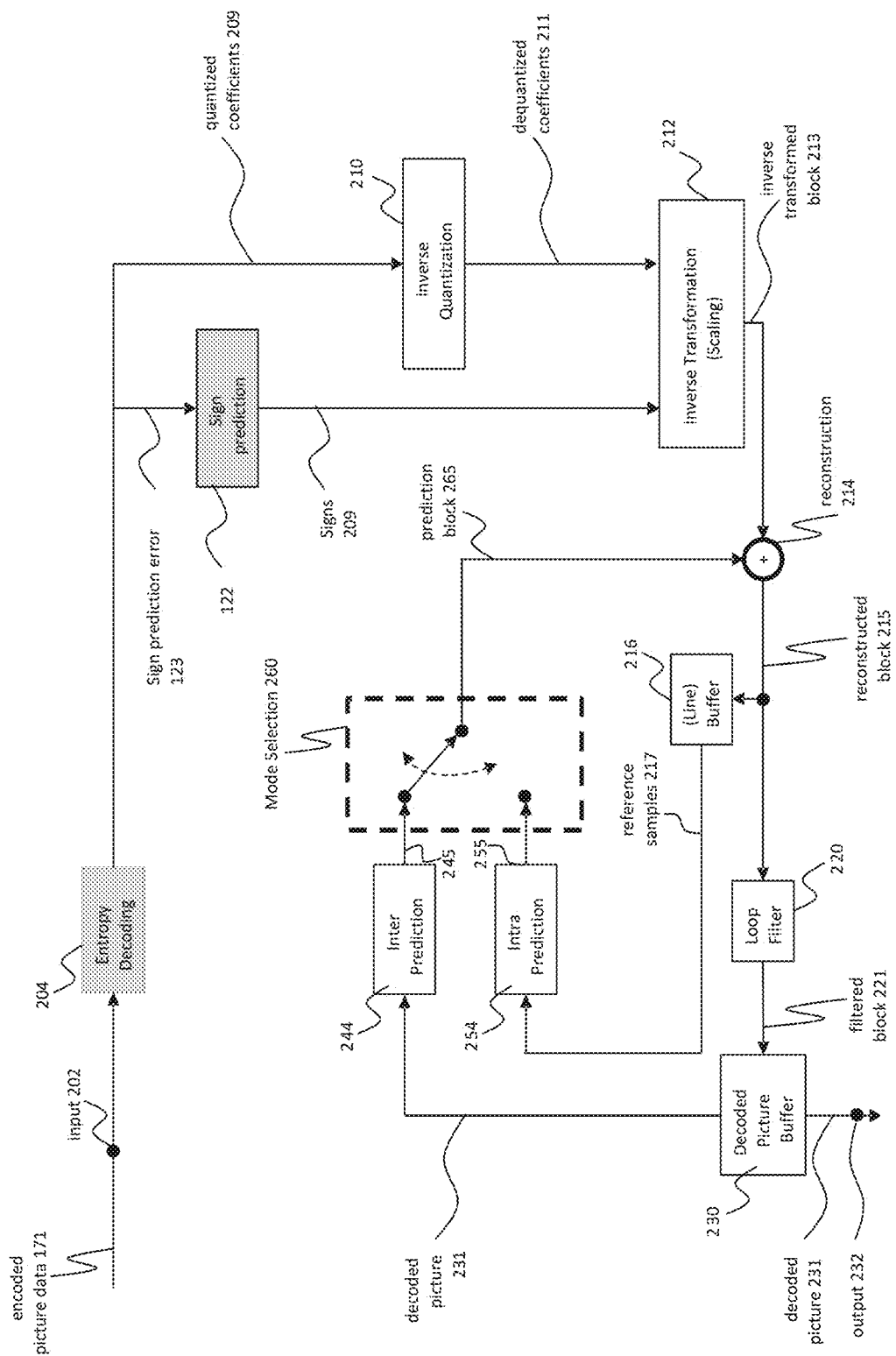
FIG. 16 gives an overview of an exemplary implementation of the disclosure at the decoder side.

An exemplary implementation of the present disclosure at the decoder side is illustrated in FIG. 16. The illustrated decoder has a new sign prediction module 122, too. The sign prediction module 122 is the same as being used at the encoder side and estimates some of the signs of the quantized transform coefficients located at the position is defined by the list of a first plurality of transform coefficients within a set of transform coefficients.

Moreover, there is a difference in the entropy decoding module 204 between the exemplary embodiment of the present disclosure of FIG. 16 and the conventional example of FIG. 9. According to the disclosure, during the parsing process (entropy decoding) only sign prediction error signal 123 is restored. No parsing dependency is introduced, i.e. the actual sign values and positions can be restored from prediction error signal 123 after the parsing process is complete, specifically, in parallel with the inverse quantization process 210.

In foregoing FIGS. 15 and 16, additional or modified modules (steps or units) compared to the examples of FIGS. 8 and 9 are shown with a light shading.

In embodiments of the present disclosure, at least the following improvements are provided:

The RSP procedure is separated into the two sub-procedures "preparation of RSP lists" and "performing other actions related to the RSP technique" and SBH is performed between these sub-procedures. These changes affect both SBH and RSP lists.

Further, there is an encoder-side modification of the SBH procedure by putting constraints on allowed changes of quantized transform coefficients from RSP lists, if there are several RSP lists (sub-lists), between which there must not be any changes in the coefficient positions distribution by the modification (in particular no crossing of the threshold between sub-lists).

Hence, the present disclosure can be beneficial in the following aspects:

The compression performance can be increased due to harmonizing RSP and SBH techniques.

Hardware computational complexities caused by the proposed method are small at both encoder and decoder sides.

The disclosure can be used in many potential applications in hybrid video coding paradigm that are compatible with the HM software and the VPX video codec family as well as the JEM (Joint Exploration Model) software and the VPX/AV1 video codec family that are state-of-the-art and the next-generation video coding frameworks, respectively.

The disclosure is applicable to a wide range of SBH and RSP techniques.

The present disclosure relates to an improved apparatus and method for harmonizing both Sign Bit Hiding (SBH) and Residual Sign Prediction (RSP) techniques in video coding. In order to improve coding efficiency, a list of transform coefficients, to which RSP is to be applied is prepared in advance of selecting a coefficient to which SBH is applied. Thereby, the RSP list can be populated in such a manner that the highest coding efficiency may be expected. Subsequently, one or more coefficients for applying SBH are selected so as not to be included in the list.

Note that this specification provides explanations for pictures (frames), but fields substitute as pictures in the case of an interlace picture signal.

Although embodiments of the disclosure have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding.

Wherever embodiments and the description refer to the term "memory", the term "memory" shall be understood and/or shall comprise a magnetic disk, an optical disc, a solid state drive (SSD), a read-only memory (Read-Only Memory, ROM), a random access memory (Random Access Memory, RAM), a USB flash drive, or any other suitable kind of memory, unless explicitly stated otherwise.

Wherever embodiments and the description refer to the term "network", the term "network" shall be understood and/or shall comprise any kind of wireless or wired network, such as Local Area Network (LAN), Wireless LAN (WLAN) Wide Area Network (WAN), an Ethernet, the Internet, mobile networks etc., unless explicitly stated otherwise.

The person skilled in the art will understand that the "blocks" ("units" or "modules") of the various figures (method and apparatus) represent or describe functionalities of embodiments of the disclosure (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limit the disclosure.

In the several embodiments provided in the present application, it should be understood that the disclosed system, apparatus, and method may be implemented in other manners. For example, the described apparatus embodiment is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Embodiments of the disclosure may further comprise an apparatus, e.g. encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the disclosure comprises or is a computer program comprising program code for performing any of the methods described herein, when executed on a computer.

An embodiment of the disclosure comprises or is a computer readable medium comprising a program code that, when executed by a processor, causes a computer system to perform any of the methods described herein.

An embodiment of the disclosure comprises or is a chipset performing any of the methods described herein.

LIST OF REFERENCE SIGNS

100 Encoder
101 Picture
102, 202 Input (e.g. input port, input interface)
103 Picture block
104 Residual calculation [unit or step]
105 Residual block
106 Transformation (e.g. additionally comprising scaling) [unit or step]
107 Transformed coefficients
108 Quantization [unit or step]
109, 209 Quantized coefficients
110, 210 Inverse quantization [unit or step]
111, 211 De-quantized coefficients
112, 212 Inverse transformation (e.g. additionally comprising scaling) [unit or step]
113, 213 Inverse transformed block
114, 214 Reconstruction [unit or step]
115,215 Reconstructed block
116, 216 (Line) buffer [unit or step]
117, 217 Reference samples
120, 220 Loop filter [unit or step]
121, 221 Filtered block
122 Sign prediction [unit or step]
130, 230 Decoded picture buffer (DPB) [unit or step]
142 Inter estimation (or inter picture estimation) [unit or step]
143 Inter estimation parameters (e.g. reference picture/reference picture index, motion vector/offset)
144, 244 Inter prediction (or inter picture prediction) [unit or step]
145 Inter prediction block
152 Intra estimation (or intra picture estimation) [unit or step]
153 Intra prediction parameters (e.g. intra prediction mode)
154, 254 Intra prediction (intra frame/picture prediction) [unit or step]
155 Intra prediction block
160, 260 Prediction [unit or step]
162, 262 Mode selection [unit or step]
165, 265 Prediction block (e.g. either inter prediction block 145 or intra prediction block 155)
170 Entropy encoding [unit or step]
171 Encoded picture data (e.g. bitstream)
172 Output (output port, output interface)
200 Decoder
204 Entropy decoding
231 Decoded picture
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data
410 Transform Unit
420 Coefficient Block

What is claimed is:

1. An apparatus for encoding signs of a set of transform coefficients of a signal, the apparatus comprising processing circuitry which is configured to:
perform a residual sign prediction sub-procedure comprising determining a list of transform coefficients, comprising a first plurality of transform coefficients out of the set of transform coefficients, according to a first predetermined rule;
select a further transform coefficient, which is out of the set of transform coefficients and not being included in the list, according to a second predetermined rule;
after performing the residual sign prediction sub-procedure, perform sign bit hiding, which comprises embedding a sign of the further transform coefficient in a result of a predetermined function of transform coefficient values in the set of transform coefficients;
perform an estimation procedure determining a respective estimated sign, which estimates a respective sign, of each of the transform coefficients in the list;
determine, for each transformation coefficient of the first plurality of transform coefficients, a binary value indicating whether or not the respective sign of the transform coefficient coincides with the respective estimated sign of the transform coefficient; and encode a sequence of binary values, comprising the binary value determined for each of the first plurality of transform coefficients, using an entropy coding technique.

2. The apparatus according to claim 1, wherein the estimation procedure comprises:

reconstructing boundary pixels of a block of an image corresponding to the set of transform coefficients in a spatial domain for each of a plurality of hypothetical combinations of signs of the first plurality of transform coefficients;

evaluating a predetermined spatial domain function indicating a smoothness of pixel values across block boundaries between the reconstructed boundary pixels and pixels of adjacent blocks for each of the hypothetical combinations of signs;

selecting a hypothetical combination of signs, of the hypothetical combinations of signs, for which the predetermined spatial domain function indicates a maximum of smoothness as the respective estimated sign of each of the transform coefficients in the list.

3. The apparatus according to claim 1, wherein the estimation procedure for estimating the signs of the transform coefficients in the list comprises:

estimating the signs based on a cost function comprising transformed difference between adjacent pixels neighboring a current image block corresponding to the set of transform coefficients and a prediction of the adjacent pixels calculated based on a prediction signal of the image block.

4. The apparatus according to claim 1, wherein the second predetermined rule defines to select, as the further transform coefficient, a most low-frequency non-zero transform coefficient not belonging to the first plurality of transform coefficients included in the list.

5. The apparatus according to claim 1, wherein the processing circuitry is further configured to encode signs of a second plurality of transform coefficients of the set by a predetermined entropy encoding procedure, the second plurality of transform coefficients comprising all remaining non-zero transform coefficients not belonging to the first plurality of transform coefficients comprised in the list and being different from the selected further transform coefficient.

6. The apparatus according to claim 1, wherein the list comprises two sub-lists, the sub-lists being divided from each other by a threshold such that a first sub-list, of the sub-lists, comprises the transform coefficients of the list having absolute values greater than the threshold and a second sub-list, of the sub-lists, comprises the transform coefficients of the list having absolute values equal to or below the threshold.

7. The apparatus according to claim 6, wherein the sequences of binary values indicating the coincidence with the estimated sign determined for each of the transform coefficients of the two sub-lists are encoded with different contexts of entropy encoding, respectively.

8. The apparatus according to claim 1, wherein the result of the predetermined function may assume two different values so that a first sign value corresponds to a first result value and a second sign value corresponds to a second result value, and the embedding the sign of the further transform coefficient comprises:

determining whether the predetermined function of the transform coefficients has the result value corresponding to the sign of the further transform coefficient; and based on determining that the predetermined function does not have the result corresponding to the sign of the further transform coefficient, modifying a value of one of the transform coefficients so that the predetermined function of the transform coefficients has the result corresponding to the sign of the further transform coefficient.

9. The apparatus according to claim 8, wherein the processing circuitry is further configured to determine the one of the transform coefficients to be modified and the modification so as to minimize a rate-distortion cost function or a modification estimation function reflecting the distortion introduced by coefficient modification or a quantized level of the coefficient.

10. The apparatus according to claim 8, wherein the list comprises sub-lists, and wherein the processing circuitry is further configured to put a constraint on the modification of the value of the one the transform coefficients so as not to permit a modification that would lead to a change in a distribution of the first plurality of transform coefficients over the sub-lists.

11. The apparatus according to claim 10, wherein, the sub-lists comprises two sub-lists, the two sub-lists being divided from each other by a threshold value of absolute values of the transform coefficients, and wherein the constraint is not to permit modification of the value of the one of the transform coefficients in case the modification would lead to a crossing of the threshold so that the modified value would belong to another sub-list than the unmodified value.

12. The apparatus according claim 1, wherein the transform coefficients are quantized transform coefficients.

13. The apparatus according to claim 1, wherein the first predetermined rule defines the list of transform coefficients as an ordered list of a predetermined number M of transform coefficients.

14. The apparatus according to claim 13, wherein the first predetermined rule further defines to include, in the list of transform coefficients, in descending order, the M transform coefficients having highest absolute values in the set of transform coefficients.

15. The apparatus according to claim 1, wherein the predetermined function is a sum of absolute transform coefficient values after quantization modulo 2.

16. The apparatus according to claim 1, wherein the processing circuitry is configured to:

select a plurality of N further transform coefficients, which are out of the set of transform coefficients and not being included in the list, according to the second predetermined rule; and embed signs of the N further transform coefficients in a result of a corresponding predetermined function of transform coefficient values in the set of transform coefficients.

17. The apparatus according to claim 16, wherein the corresponding predetermined function is a sum of absolute transform coefficient values after quantization modulo $2^N$.

18. The apparatus according to claim 1, the apparatus being further for encoding signs of a plurality of sets of transform coefficients of the signal, the plurality of sets comprising the set, wherein the processing circuitry is configured to:

split transform coefficients of a transform unit into a plurality of sets of transform coefficients; and for each of the plurality of sets of transform coefficients perform the encoding comprising: determining the corresponding list of transform coefficients, selecting the corresponding further transform coefficient, embedding the corresponding sign of the further transform coefficient, performing the corresponding estimation procedure, determining the corresponding sequence of binary values, and encoding the corresponding sequence of binary values.

19. The apparatus according to claim 18, wherein:
the transform unit is a two-dimensional block of transform coefficients obtained by transforming an image signal, the signal comprising the image signal, and
the processing circuitry is configured to split the transform unit into a plurality of two dimensional blocks as the plurality of sets of transform coefficients.

20. The apparatus according to claim 18, wherein:
the transform unit is a two-dimensional block of transform coefficients obtained by transforming an image signal, the signal comprising the image signal, and
the processing circuitry is configured to:
scan the transform coefficients of the transform unit according to a predefined order; and
split the scanned transform coefficients into a plurality of one dimensional chunks as the plurality of sets of transform coefficients.

21. An apparatus for decoding signs of a set of transform coefficients of a signal, the apparatus comprising processing circuitry which is configured to:
decode an entropy encoded sequence of a first plurality of binary values;
perform a residual sign prediction sub-procedure comprising determining a list of transform coefficients, comprising a first plurality of transform coefficients out of the set of transform coefficients, according to a first predetermined rule;
select a further transform coefficient, which is out of the set of transform coefficients and not being included in the list, according to a second predetermined rule;
after performing the residual sign prediction sub-procedure, perform hidden sign retrieval, which comprises determining a sign of the further transform coefficient by calculating a predetermined function of transform coefficient values in the set of transform coefficients;
perform an estimation procedure determining estimated signs, which estimate the corresponding signs, of the transform coefficients in the list; and
correct the estimated signs using the decoded sequence of the first plurality of binary values, so as to obtain the signs of the first plurality of transform coefficients.

22. The apparatus according to claim 21, wherein the estimation procedure for determining the estimated signs of the transform coefficients in the list comprises:
reconstructing boundary pixels of a block of an image corresponding to the set of transform coefficients in a spatial domain for each of a plurality of hypothetical combinations of signs of the first plurality of transform coefficients;
evaluating a predetermined spatial domain function indicating smoothness of pixel values across block boundaries between the reconstructed boundary pixels and pixels of adjacent blocks for each of the hypothetical combinations of signs; and
selecting a hypothetical combination of signs, of the hypothetical combinations of signs, for which the predetermined spatial domain function indicates a maximum of smoothness, as the estimated signs of the transform coefficients.

23. The apparatus according to claim 21, wherein the estimation procedure determining the estimated signs of the transform coefficients in the list comprises:
estimating the corresponding signs based on a cost function comprising a transformed difference between adjacent pixels neighboring a current image block corresponding to the set of transform coefficients and a prediction of the adjacent pixels calculated based on a prediction signal of the image block.

24. The apparatus according to claim 21, wherein the decoded sequence of the first plurality of binary values indicates, for each of the transform coefficients in the list, whether or not a corresponding sign of a respective one of the transform coefficients coincides with a corresponding estimated sign of the respective one of the transform coefficients.

25. The apparatus according to claim 21, wherein the second predetermined rule defines to select, as the further transform coefficient, the most low-frequency non-zero transform coefficient not belonging to the first plurality of transform coefficients included in the list.

26. The apparatus according to claim 21, wherein:
the list comprises two sub-lists, the sub-lists being divided from each other by a threshold such that a first sub-list comprises the transform coefficients having absolute values greater than the threshold and a second sub-list comprises the transform coefficients having absolute values equal to or below the threshold, and
the decoded sequence of the first plurality of binary values comprises two sub-sequences that are encoded with different contexts of entropy encoding, respectively.

27. The apparatus according to claim 21, wherein a result of the calculation of the predetermined function assumes two different values and the sign of the further transform coefficient is determined according to a rule that it is a first sign value if the result is a first value and a second sign value if the result is a second value.

28. The apparatus according to claim 21, wherein the transform coefficients are quantized transform coefficients.

29. The apparatus according to claim 21, wherein the first predetermined rule defines the list of transform coefficients as an ordered list of a predetermined number M of transform coefficients.

30. The apparatus according to claim 29, wherein the first predetermined rule further defines to comprise, in the list of transform coefficients, in descending order, the M transform coefficients having highest absolute values in the set of transform coefficients.

31. The apparatus according to claim 21, wherein the predetermined function is a sum of absolute transform coefficient values after quantization modulo 2.

32. The apparatus according to claim 21, wherein the processing circuitry is configured to:
select a plurality of N further transform coefficients, which are out of the set of transform coefficients and not included in the list, according to the second predetermined rule; and
embed signs of said the N further transform coefficients in a result of a predetermined function of transform coefficient values in the set of transform coefficients.

33. The apparatus according to claim 32, wherein the predetermined function is a sum of absolute transform coefficient values after quantization modulo $2^N$.

34. The apparatus according to claim 21, the apparatus being further for decoding signs of a plurality of sets of transform coefficients of the signal, the plurality of sets comprising the set, wherein the processing circuitry is configured to:
split transform coefficients of a transform unit into the plurality of sets of transform coefficients; and
for each of the plurality of sets of transform coefficients perform the decoding comprising: decoding the entropy encoded sequence; determining the list of transform coefficients; selecting the further transform coefficient; determining the sign of the further transform coefficient, performing the estimation procedure, an correcting the estimated signs to obtain the signs of the first plurality of transform coefficients.

35. The apparatus according to claim 34, wherein:
the transform unit is a two-dimensional block of transform coefficients obtained by transforming an image signal, the signal comprising the image signal, and
the processing circuitry is configured to split the transform unit into a plurality of two dimensional blocks as the plurality of sets of transform coefficients.

36. The apparatus according to claim 34, wherein:
the transform unit is a two-dimensional block of transform coefficients obtained by transforming an image signal, the signal comprising the image signal, and
the processing circuitry is configured to:
scan transform coefficients of the transform unit according to a predefined order; and
split the scanned transform coefficients into a plurality of one dimensional chunks as the plurality of sets of transform coefficients.

37. A method of encoding signs of a set of transform coefficients of a signal, the method comprising:
performing a residual sign prediction sub-procedure comprising determining a list of transform coefficients, comprising a first plurality of transform coefficients out of the set of transform coefficients, according to a first predetermined rule;
selecting a further transform coefficient, which is out of the set of transform coefficients and not included in the list, according to a second predetermined rule;
after performing the residual sign prediction sub-procedure, perform sign bit hiding, which comprises embedding a sign of the further transform coefficient in a result of a predetermined function of transform coefficient values in the set of transform coefficients;
performing an estimation procedure determining a respective estimated sign, which estimates a respective sign, of each of the transform coefficients in the list;
determining, for each transformation coefficient of the first plurality of transform coefficients, a binary value indicating whether or not the respective sign of the transform coefficient coincides with the respective estimated sign of the transform coefficient; and
encoding a sequence of binary values, comprising the binary value determined for each of the first plurality of transform coefficients, using an entropy coding technique.

38. A method of decoding signs of a set of transform coefficients of a signal, the method comprising the steps of
decoding an entropy encoded sequence of a first plurality of binary values;
perform a residual sign prediction sub-procedure comprising determining a list of transform coefficients, comprising a first plurality of transform coefficients out of the set of transform coefficients, according to a first predetermined rule;
selecting a further transform coefficient, which is out of the set of transform coefficients and not included in the list, according to a second predetermined rule;
after performing the residual sign prediction sub-procedure, performing hidden sign retrieval, which comprises determining a sign of the further transform coefficient by calculating a predetermined function of transform coefficient values in the set of transform coefficients;
performing an estimation procedure determining estimated signs, which estimate the corresponding signs of the transform coefficients in the list; and
correcting the estimated signs by using the decoded sequence of the first plurality of binary values, so as to obtain the signs of the first plurality of transform coefficients.

39. A non-transitory computer readable medium comprising a program code that, when executed by a processor, causes a computer system comprising the processor to perform the method according to claim 37.

40. A non-transitory computer readable medium comprising a program code that, when executed by a processor, causes a computer system comprising the processor to perform the method according to claim 38.

* * * * *

UNITED STATES PATENT AND TRADEMARK OFFICE
CERTIFICATE OF CORRECTION

| | |
|---|---|
| PATENT NO. | : 11,265,535 B2 |
| APPLICATION NO. | : 17/013094 |
| DATED | : March 1, 2022 |
| INVENTOR(S) | : Filippov et al. |

It is certified that error appears in the above-identified patent and that said Letters Patent is hereby corrected as shown below:

On the Title Page

Attorney, Agent, or Firm (74): "Leydig, Voit & Maver, Ltd." should read -- Leydig, Voit & Mayer, Ltd. --.

Signed and Sealed this
Nineteenth Day of July, 2022

Katherine Kelly Vidal
*Director of the United States Patent and Trademark Office*